United States Patent
Rogers et al.

(10) Patent No.: US 8,032,279 B2
(45) Date of Patent: Oct. 4, 2011

(54) WHEEL ALIGNMENT HEAD AND SYSTEM WITH ADVANCED POWER MANAGEMENT

(75) Inventors: Steven W. Rogers, Conway, AR (US); Adam C. Brown, Maumelle, AR (US); Eric Bryan, Conway, AR (US); Ronald C. Swayne, Sherwood, AR (US); Michael J. Kling, Little Rock, AR (US)

(73) Assignee: Snap-On Incorporated, Kenosha, WI (US)

( * ) Notice: Subject to any disclaimer, the term of this patent is extended or adjusted under 35 U.S.C. 154(b) by 1030 days.

(21) Appl. No.: 11/829,442

(22) Filed: Jul. 27, 2007

(65) Prior Publication Data
US 2009/0030558 A1 Jan. 29, 2009

(51) Int. Cl.
*G06F 7/00* (2006.01)
(52) U.S. Cl. .......................... 701/36; 701/29
(58) Field of Classification Search .................. 701/29, 701/36; 700/279; 324/76.11; 33/286, 203; 356/139.09, 155
See application file for complete search history.

(56) References Cited

U.S. PATENT DOCUMENTS

| | | | | |
|---|---|---|---|---|
| 4,274,739 A * | 6/1981 | Grubbs et al. | ................. | 356/155 |
| 4,761,749 A * | 8/1988 | Titsworth et al. | ............. | 700/279 |
| 4,931,964 A * | 6/1990 | Titsworth et al. | ............. | 700/279 |
| 5,375,335 A | 12/1994 | Friton et al. | | |
| 5,592,383 A | 1/1997 | Rogers et al. | | |
| 6,509,962 B1 | 1/2003 | Burns, Jr. | | |
| 6,574,877 B2 * | 6/2003 | Gray et al. | ................. | 33/203.18 |
| 7,684,026 B2 * | 3/2010 | Rogers et al. | ............. | 356/139.09 |
| 2002/0193910 A1 | 12/2002 | Strege et al. | | |
| 2004/0246470 A1 | 12/2004 | Burns et al. | | |
| 2007/0129860 A1 | 6/2007 | Voeller | | |

FOREIGN PATENT DOCUMENTS
WO    WO 02/090886    11/2002

OTHER PUBLICATIONS

Search Report dated Sep. 11, 2008.
Partial International Search dated May 14, 2008, pp. 1-7.

* cited by examiner

*Primary Examiner* — Yonel Beaulieu
(74) *Attorney, Agent, or Firm* — McDermott Will & Emery LLP

(57) ABSTRACT

A wheel alignment head and system use advanced power management to reduce non-essential power consumption, to extend operation time between charges. The wheel alignment head is operable in a first operation state and a second operation state that consumes less power than the first operation state. In response to an occurrence of at least one of preset events, the wheel alignment head switches its operation from the first operation mode to the second operation mode.

15 Claims, 16 Drawing Sheets

WHEEL ALIGNMENT HEAD AND SYSTEM WITH ADVANCED POWER MANAGEMENT

TECHNICAL FIELD

The present subject matter relates to techniques and equipment for vehicle wheel alignment with reduced power consumption.

BACKGROUND

Cordless alignment systems are popular because they abolish the use signal cords between alignment heads, alignment cameras and console stations, which substantially reduces obstructions to operations and risks of injuries. However, cordless alignment systems rely on batteries to supply power to alignment heads. Smaller batteries, though lighter in weight, substantially limit the operation time of the alignment heads. On the other hand, batteries with higher capacities tend to be heavier. While high capacity batteries allow longer operation time, they add weight to the alignment heads and cause difficulties in installation, operation, maneuverability and transportation. Accordingly, a cordless alignment system with light weight and extended usage time is highly desirable.

SUMMARY

The teachings herein provide advanced power management to alignment heads and systems to reduce power consumption and extend operation time between charges. Embodiments of unique designs for charging wireless alignment heads are also described.

An exemplary alignment head is operable in a first operation mode, such as a normal operation mode, and a second operation mode, such as a power saving mode, which consumes less power than the first operation mode. The alignment head switches from the first operation mode to the second operation mode when at least one preset event occurs. The alignment head includes a data processor for managing the operation and power management of the alignment head, and at least one functional module for performing a designated function. The data processor monitors activities of the at least one functional module, and responsive to the occurrence of the at least one preset event, controls the alignment head to enter the second operation mode by performing prescribed steps, such as selectively adjusting an operation of the functional modules or the alignment head.

The functional modules may include at least one of: a wireless communication interface configured to communicate with a computer or a companion alignment head; at least one tilt sensor for sensing a tilt angle of the alignment head; a potentiometer; an image sensor for producing image data representing an image taken of a target associated with a vehicle wheel; a spatial relationship sensor for measuring a spatial relationship between the alignment head and the companion alignment head; an illumination device configured to illuminate the target; a battery configured to power the alignment head; a gas gauge configured to generate information related to the battery; and a user interface configured to generate output information and receive input.

The at least one preset event may include at least one of a low battery charge level, lack of change in data obtained by at least one of the functional modules, a low rate of change of the measurements, an input directing entry to the second operation mode, an increase in inactivity time of one of the functional modules, and receipt of a command from the computer to enter into the second operation mode.

The one or more prescribed steps include at least one of turning off part or all of the power supplied to at least one of the functional modules or the data processor; reducing a frequency in fetching data from at least one of the functional modules; reducing a sampling rate of at least one of the functional modules in obtaining sensed data; reducing a frequency in performing calculations of data received from at least one of the functional modules; skipping service at least one of the functional modules if the at least one of the functional modules is in sleep mode; and altering an operation of at least one of the functional modules; selectively purging data received from at least one of the functional modules; and activating a notification signal.

The operation of the functional modules may be altered to reduce power consumption. Exemplary alterations include reducing a frequency of the at least one of the functional modules in capturing target images; switching to a lower image resolution for the at least one of the functional modules in capturing target images; reducing an intensity of illumination produced by the at least one of the functional modules; reducing a frequency of the at least one of the functional modules in sensing signals from a companion alignment head; and reducing a frequency of the at least one of the functional modules in communicating with a companion alignment head or a computer system.

This disclosure also describes adaptive power management techniques that gradually adjust the level of power saving based on an operation condition of a functional module or the alignment head.

The alignment head may exit the second operation mode or the power saving mode when specific activities are detected at one or more functional modules. The activities may be a vibration or movement detected by at least one of the functional modules, a wake up signal received from a computer system via a wireless communication interface, an input signal indicating that a user wishes to operate the alignment head, and a spatial relationship change caused by a companion alignment head and detected by a spatial relationship sensor, etc.

In another embodiment, a wheel alignment head is implemented with a skillfully arranged data fetching sequence, such that effective data is fetched or shifted out of a sensor prior to other ineffective or redundant data generated by the same sensor. The ineffective or redundant data is purged, dropped or simply overwritten to reduce non-essential power consumption.

This disclosure also describes a unique charging mechanism that allows a docking device to charge an alignment head even if an external power source, such as an AC power source, is unavailable to the docking device.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Reference now is made in detail to the examples illustrated in the accompanying drawings and discussed below.

System Architecture

Figure 1:
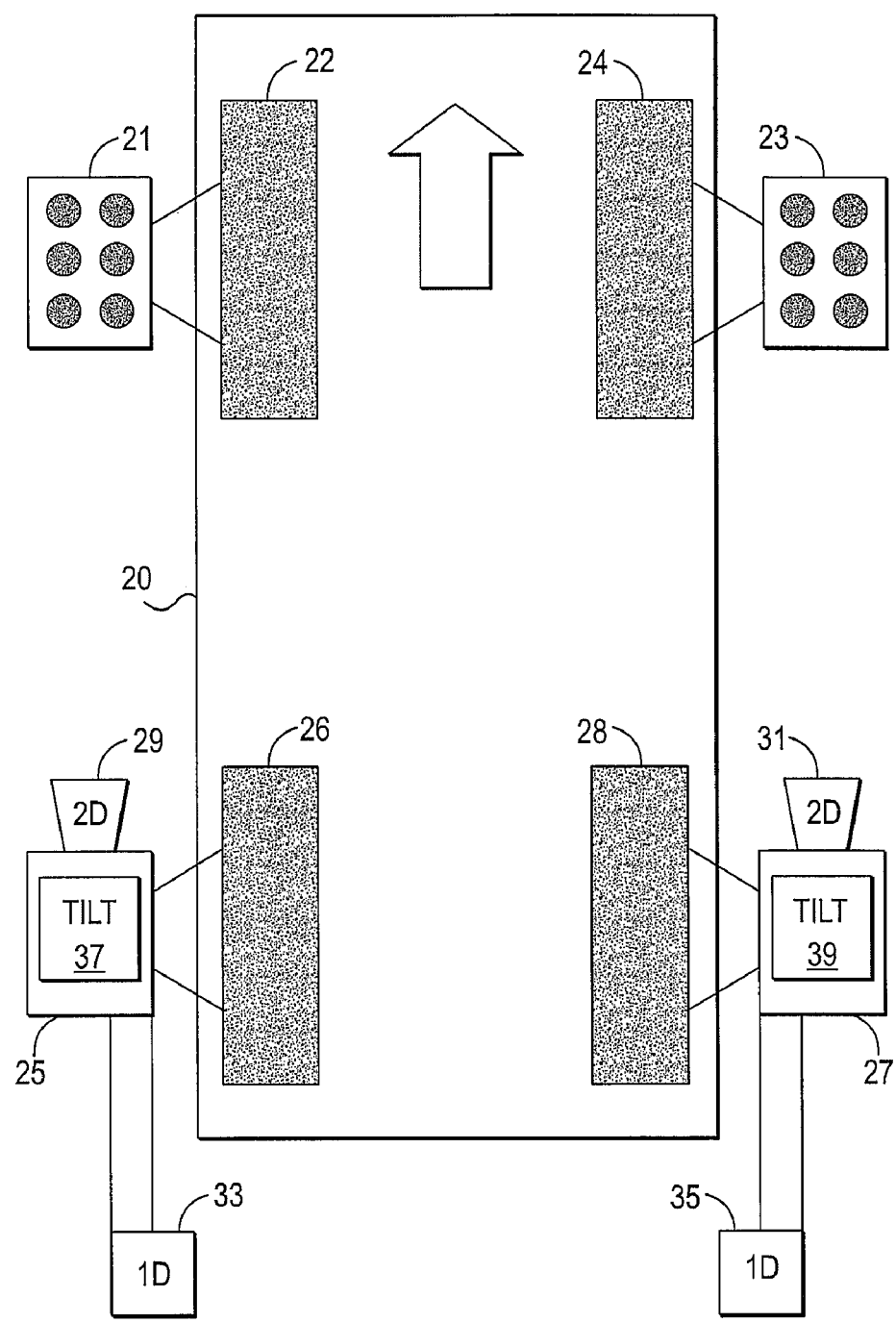
FIG. 1 diagrammatically illustrates a first arrangement of targets and active sensing heads in relation to vehicle wheels.

FIG. 1 depicts an exemplary alignment system embodying the teachings and techniques of this disclosure. Except for the wheels, elements of the vehicle are omitted for ease of illustration.

The wheel alignment system includes a pair of passive heads 21 and 23 mounted on respective wheels 22 and 24 of the vehicle, which are front steering wheels in this first example. The active sensing heads 25 and 27 are adapted for mounting in association with other respective wheels 26 and 28 of the vehicle, in this case the rear wheels. Each active sensing head includes an image sensor 29 or 31 for producing image data, which is expected to include an image of a passive target when the various heads are mounted to the respective wheels of the vehicle 20. In this first example, the image sensors 29 and 31 in the active sensing heads 25 and 27 are two dimensional (2D) imaging devices, e.g. cameras.

The heads 21 and 23 are passive in that they include targets but do not include any sensing elements. Each of the passive heads 21 and 23 includes a target of a type that may be observed by one of the image sensors 29 or 31 in the active heads 25 and 27. A target on a passive head 21 or 23, for image sensing by a sensor on another head, may be active or passive. An active target, such as a light emitting diode (LED), is a source driven by power to emit energy (e.g. IR or visible light) that may be detected by a sensor. A passive target is an element that is not driven by power and does not emit energy for detection by a sensor. Assuming an image sensor in head 25 or 27, a passive target would be an object that reflects (or does not reflect) light or other energy in a manner detectable by the respective image sensor. In the example, although the targets could comprise one or more light emitting elements, the targets comprise light and dark regions that can be detected when illuminated by other sources and imaged by cameras or the like in the active sensing heads 25 and 27.

Figure 1A:
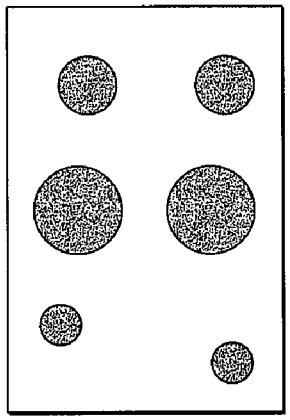
FIGS. 1A and 1B illustrate different types of targets that may be used on passive heads.
Figure 1B:
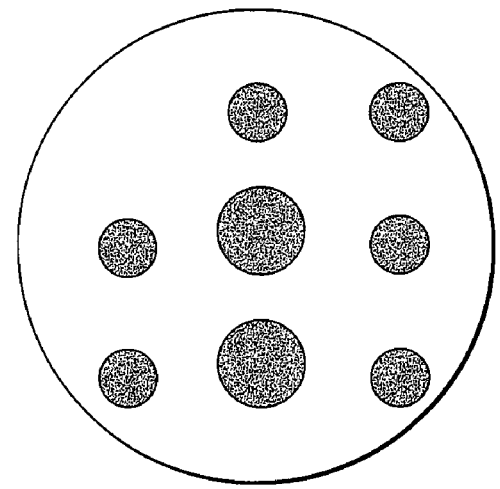

A first example of a target that can be used on either of the passive wheel heads 21 is illustrated in FIG. 1A. In this first example, the target is rectangular. A second example of a target that can be used on either of the passive wheel heads 21 is illustrated in FIG. 1B. In this second example, the target is circular. In each case, the target consists of a flat plate with a pattern of differently sized circles marked on or mounted on the surface of the plate in a pre-determined format and patter. Although specific patterns are shown FIGS. 1A and 1B, it will be evident that a large number of different patterns can be used on each target. For example, a larger or smaller number of dots may be included and other sizes and shapes can be used for the dots. As another example, multifaceted plates or objects can also be used for the targets. Many examples utilize a number of retro-reflective elements arranged to form each target. For further information, attention is directed to U.S. Pat. No. 5,724,743 to Jackson, the entire disclosure of which is incorporated herein by reference.

The system also includes a spatial relationship sensor associated with at least one of the active sensing heads 25 or 27. The spatial relationship sensor enables measurement of the spatial relationship between the active sensing heads 25 and 27 when the active sensing heads are mounted on wheels of the vehicle. In general, spatial relationship sensors may measure relative position and/or orientation, depending on the type of sensor used. A positional measurement refers to the relative position of the measured item from the perspective or in the coordinate system of the measuring device. Measurement of position generally uses a standard coordinate system such as Cartesian coordinates or polar coordinates. Orientation may be derived from a three-dimensional position measurement, or orientation may be measured independently of position. Orientation relates to the rotational position of the measured device with respect to the measuring device expressed in a standard coordinate system. Orientation is generally expressed in rotational angles in three orthogonal reference planes.

It will be readily apparent to someone skilled in the art that the wheel alignment systems discussed herein may be implemented with various different types of spatial relationship sensors. In this first example, the system uses two conventional (1D) angle sensors 33 and 35 to measure the relative angles of the active sensing heads 25 and 27, in the toe plane.

The active heads 25 and 27 also contain gravity sensors or the like to measure tilt, typically camber and pitch, of the head. In this first example, the head 25 includes one or more tilt sensors 37; and the head 27 includes one or more tilt sensors 39.

As shown in a more detailed example later (regarding FIG. 2), the system also includes a computer. The computer processes image data relating to observation of the targets and tilt data, from the active sensing heads. The computer also processes spatial relationship data from the at least one spatial relationship sensor. The data processing enables computation of at least one measurement of the vehicle.

Measurement using image processing techniques is fundamentally different than using conventional angle measurement technology in a wheel alignment system. Although basic image processing techniques are known to those skilled in the art, a brief description is presented for clarity. The image of a body varies according to the perspective from which such body is viewed and the variation in the image is directly related to and determinable from the perspective angle of the view path along which the body is viewed. Furthermore, it is known that it is possible to determine the perspective angles at which an object is viewed merely by relating the perspective image of that object with a true non-perspective image thereof. Conversely put, it is possible to determine the angles at which an object is orientated to a view path (or a plane perpendicular thereto) by comparing a perspective image of an object with a non-perspective image thereof.

In practice, a mathematical representation, or data corresponding to a true image (i.e. an image taken by viewing the target perpendicularly to its primary plane) and the dimensions of the target are preprogrammed into the memory of the computer so that, during the alignment process, the computer has a reference image to which the viewed perspective images of the targets can be compared.

The way that the computer calculates the orientation of the target is to identify certain geometric characteristics on the target, take perspective measurements of these and compare these measurements with the true image previously preprogrammed into the memory of the computer.

Furthermore, as the true dimensions of the target are preprogrammed into the memory of the computer, the method and apparatus of this invention can be used to determine the exact position of the wheels in three-dimensional space. This can be done by firstly determining the perspective image of certain of the elements of the pattern on the target (for example, the distances between circles) and comparing the dimensions of this image to the true dimensions of those elements. This will yield the distance that the element and, accordingly, the target is from the image sensor.

For the wheel alignment system discussed herein, the image sensor in the active head views a target attached to a wheel and produces image data which describes a perspective image of the target. The computer correlates the perspective image data for the targets with the true shape of the target. In so doing, the computer relates the dimensions of certain known geometric elements of the target with the dimensions of corresponding elements in the perspective image and by performing certain trigonometric calculations (or by any other suitable mathematical or numerical methods), calculates the alignment of the wheel of the vehicle. The computer can also calculate the three-dimensional position and orientation of the axis of rotation of the wheel (wheel axis) associated with the passive target.

For additional information regarding measurement based on processing of images of targets, attention again is directed to U.S. Pat. No. 5,724,743 to Jackson, the entire disclosure of which is incorporated herein by reference.

Figure 2:
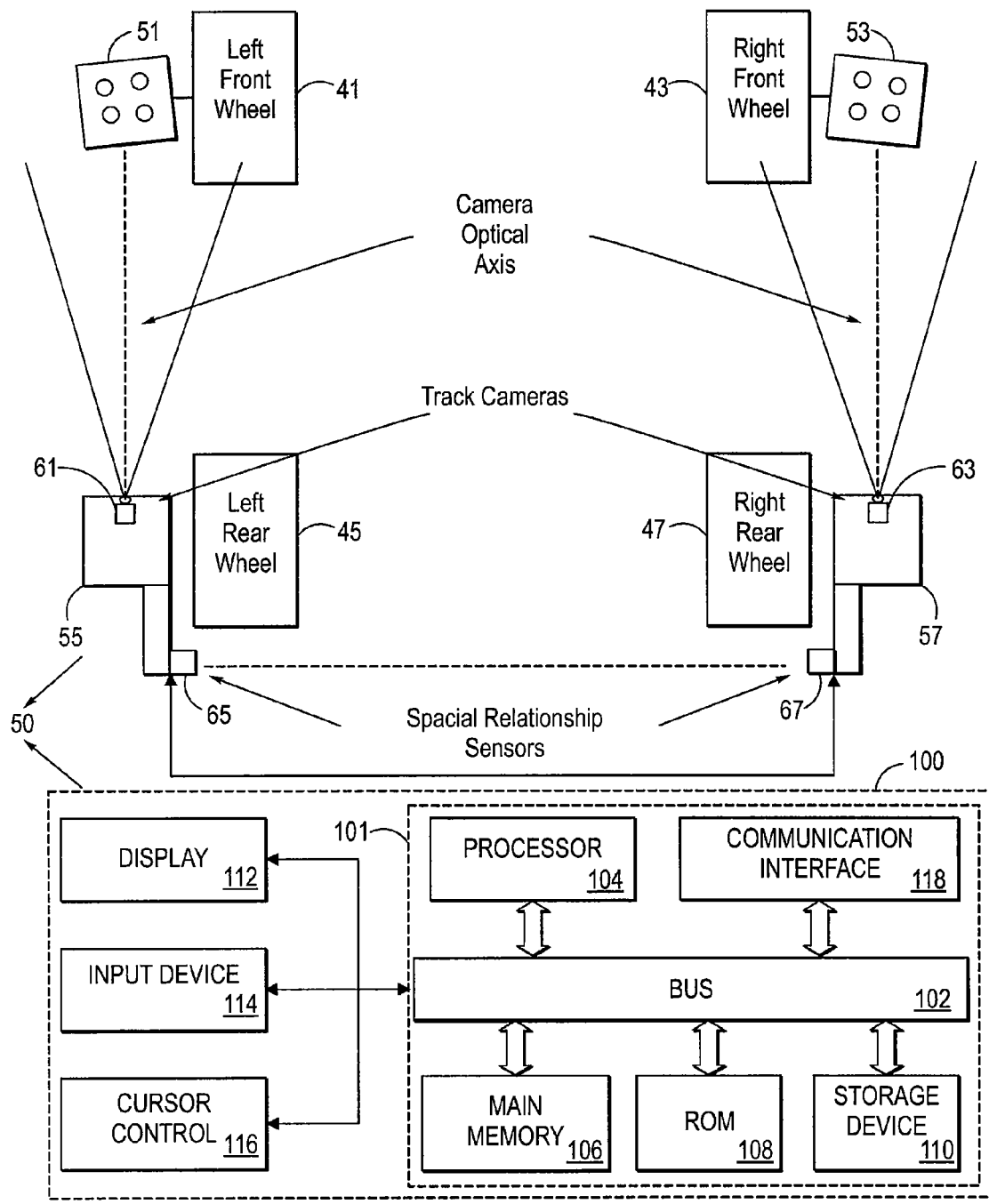
FIG. 2 is a functional block diagram of an exemplary wheel alignment system, with elements thereof mounted to wheels of a subject vehicle (although other elements of the vehicle are omitted for convenience).

FIG. 2 depicts a more comprehensive example of an exemplary wheel alignment system 50 as well as four wheels 41, 43, 45 and 47 of a vehicle (otherwise not shown, for simplicity). The system 50 includes four heads 51, 53, 55 and 57 for mounting on or otherwise in association with the wheels 41, 43, 45 and 47 as shown stylistically in the drawing. A variety of different types of mounting devices may be used. In this example, the passive heads 51 and 53 are mounted on the front wheels 41 and 43, and the front heads 51 and 53 use retro-reflective targets. When mounted on the wheels as shown, the retro-reflective targets face rearward, so as to be observable by the image sensors in the respective active sensing heads. The retro-reflective targets may be similar to those used in three-dimensional (3D) machine vision alignment systems. The heads 55 and 57 mounted on the rear wheels 45 and 47 are active sensing heads, in that they include image sensing elements. In this example, the heads 55 and 57 further include tilt and spatial relationship sensing elements, as discussed below, for obtaining information for processing by a host computer system 100 of the wheel alignment system 50. According one embodiment of this disclosure, data obtained by the heads 55 and 57 is transmitted to the host computer system 100 in a wireless manner using WIFI, Bluetooth, UWB (Ultra-Wideband), Zigbee, or any other suitable wireless technology.

An imaging sensor, such as an alignment camera, is positioned in each of rear heads. The optical axis of each such camera faces forward along the track of the vehicle, in order to measure the position and orientation of the targets attached to the front wheels. The cameras need not be directly on the track of the vehicle wheels, that is to say on the roll line of the wheels. The cameras need only to face alongside the wheel track sufficiently to view and capture images of the targets on the passive heads 51, 53 associated with the front wheels. In the example, the active sensing head 55 includes an image sensing module or the like containing an image sensor in the form of a camera 61 facing forward along the track of the left wheels. When so mounted, the field of view of the camera 61 includes the target portion of the passive head 51 mounted on the left front wheel 41. Similarly, the active sensing head 57 includes an image sensing module or the like containing an image sensor in the form of a camera 63 facing forward along the track of the right wheels. When so mounted, the field of view of the camera 63 includes the target portion of the passive head 53 mounted on the right front wheel 43.

One or more sensors are attached to the rear heads 55, 57 and positioned to measure a spatial relationship between the two active sensing heads. A variety of available sensing technologies may be used, and two examples are discussed, later. In the example illustrated in FIG. 2, the active sensing head 55 includes a sensor 65; and the active sensing head 57 includes a sensor 67. The sensors 65 and 67 in this application are used for sensing the relative angular relationship between the active sensing heads 55 and 57, whereas the image signals from the cameras 61 and 64 are processed to compute regular front wheel alignment parameters, such as camber and toe.

Each rear head 55 or 57 also incorporates one or more inclinometers, which are used as tilt sensors to measure the relative camber and pitch angles of each rear head to gravity. These inclinometers, for example, may comprise MEMS type devices designed to be integral to the track camera printed circuit board.

Figure 3:
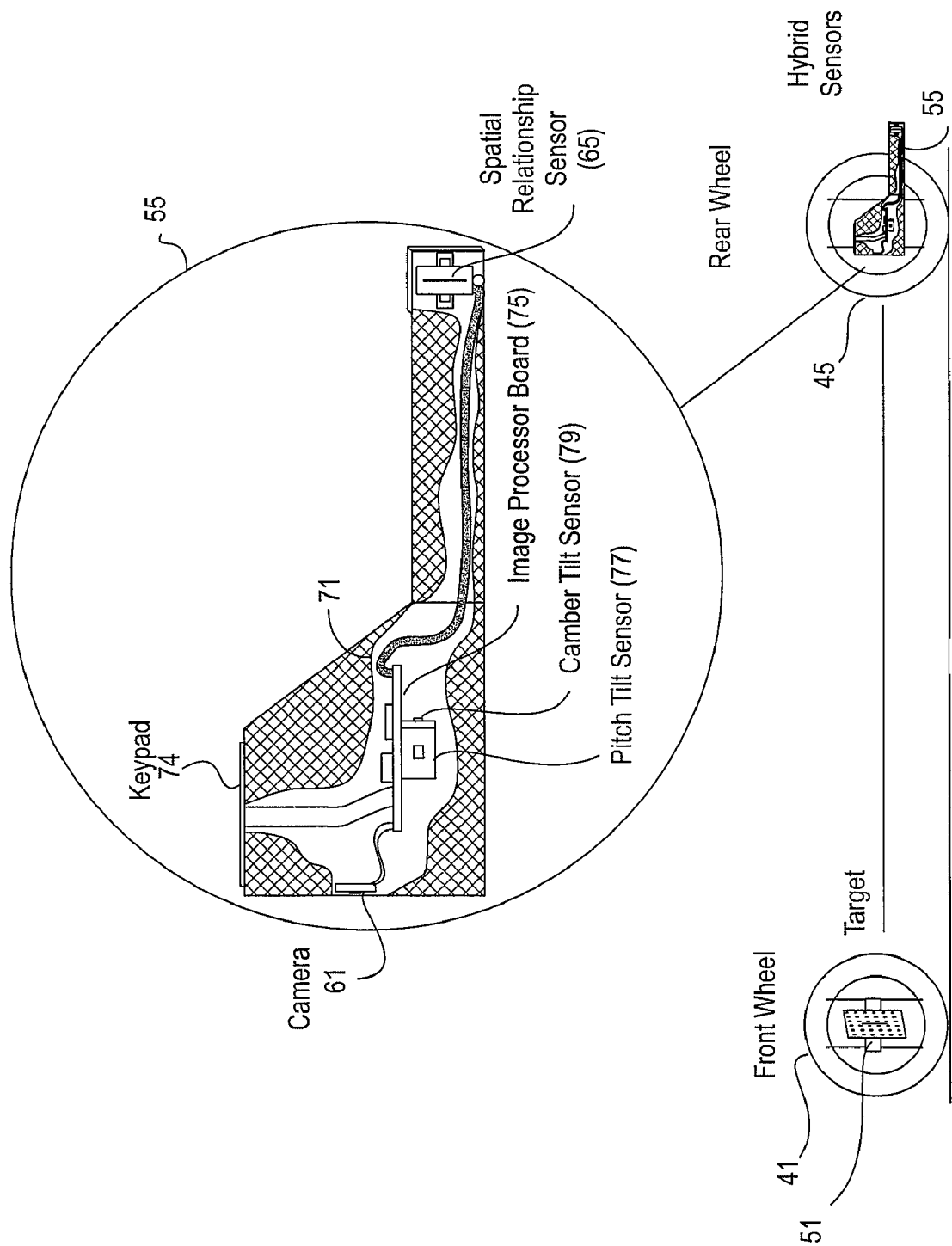
FIG. 3 is a side view of some of the wheel mounted components of the system, with one of the active sensing heads shown in a partial cross-sectional detail view.

FIG. 3 is a side view of some of the wheel mounted components of the system. This left side view shows the left front head 51, with its passive target, attached to the left front wheel 41. The side view also shows the left rear active sensing head 55, attached to the left rear wheel 45. FIG. 3 also provides an enlarged detail view, partially in cross section, of elements of the active sensing head 55.

As shown, the head 55 comprises a housing 71. Hardware for mounting the housing to the wheel is omitted for clarity. The housing 71 contains the forward facing track camera 61. In this example, the spatial relationship sensor 65 uses a beam angle detection technology, discussed later with regard to FIG. 6, although other types of sensors may be used. The housing also contains a user interface 74 for communicating with the user and a printed circuit board 75 containing the data processing electronics for processing the data from the camera(s) and other sensors and communications with the host computer. For purpose of forming the sensing head of an exemplary system, the board 75 also supports a pitch tilt sensor 77 and a camber tilt sensor 79. Although shown separately, the two tilt sensors 77, 79 may be elements of a single inclinometer module. The sensors 77, 79 communicate inclination readings to a processor on the board 75, for transmission with the camera data to the host computer system 100.

Figure 4:
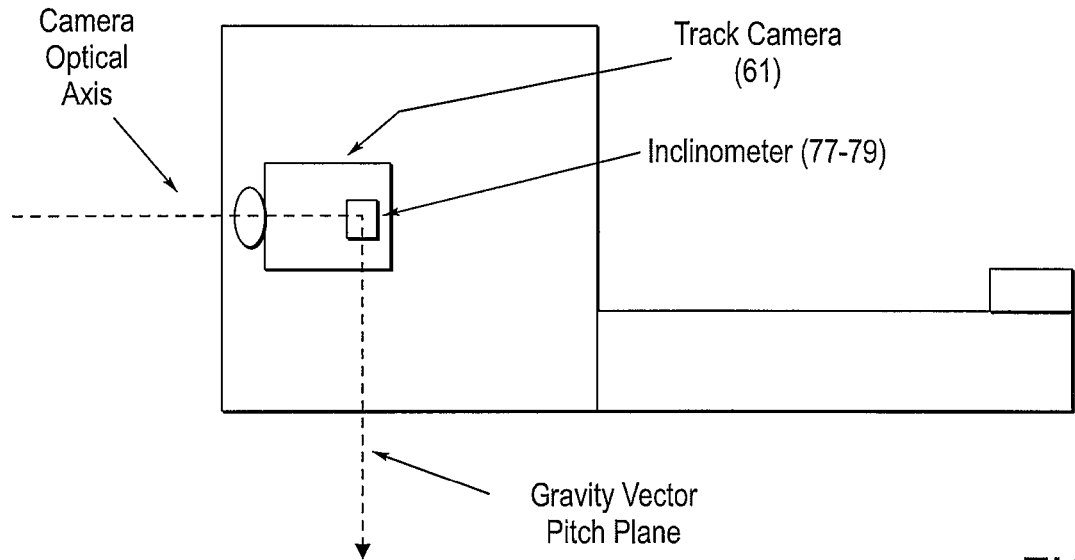
FIG. 4 is a side view of one of the active sensing heads useful in explaining the relationship of the camera axis to the pitch plane of the measured gravity vector.
Figure 5:
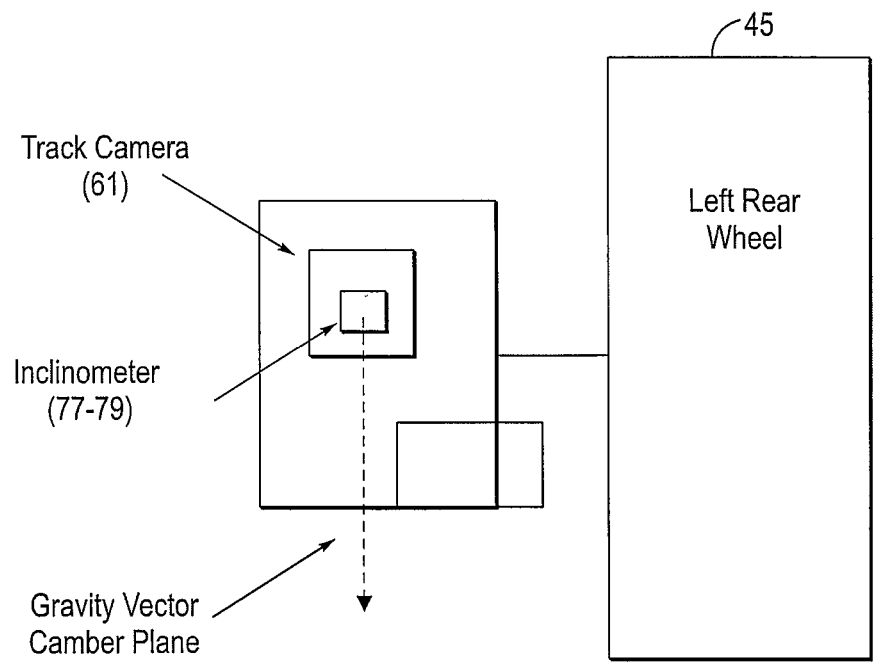
FIG. 5 is a rear view of one of the active sensing heads useful in explaining the relationship of the camera to the camber plane of the measured gravity vector.

FIGS. 4 and 5 are somewhat stylized illustrations of the active sensing head 55, in side and rear views, which illustrate the relationship of the axes measured by the tilt sensors to the other elements. It is assumed for discussion here that the tilt sensors 77-79 are elements of a single MEMS inclinometer. The inclinometer determines the gravity vector with respect to the pitch plane (FIG. 4) and the gravity vector with respect to the camber plane (FIG. 5). Similar measurements, of course, are taken for the other active sensing head 57 (FIG. 2). In this way, each head's orientation to gravity can be processed to relate each track facing camera's optical axis to gravity (FIGS. 4 and 5). In this way, the relationship of each front target to gravity can also be measured by processing of the image data and the gravity vector data.

Figure 6:
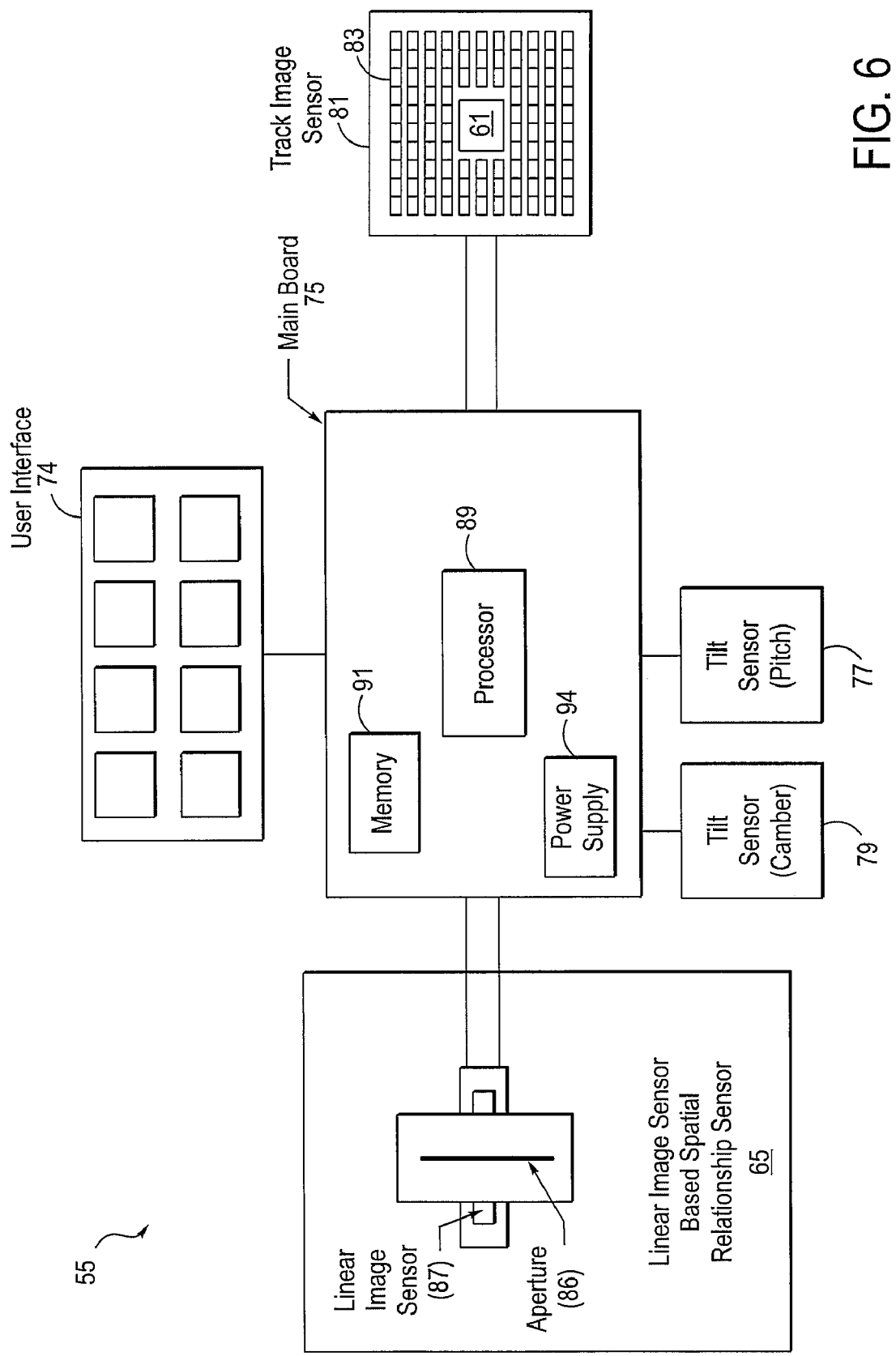
FIG. 6 is a functional block diagram of the components of one of the exemplary active sensing heads.

FIG. 6 is a functional block diagram of the elements of one of the active sensing heads, in this case the head 55, although the elements of the head 57 will be generally similar in this first example.

As discussed above, the active sensing head 55 includes an image sensing module 81 or the like containing an image sensor in the form of the track camera 61 which in use will face forward along the track of the left wheels to allow that camera to obtain images containing the target of the passive head 51 (see also FIG. 2). The track facing image sensor module 81, illustrated in FIG. 6, includes an LED array 83, serving as an illuminator, to emit light for desired illumination of the target on the head 51 mounted to the vehicle wheel 41 on the same side of the vehicle. The camera 61 is a digital camera that senses the image for the wheel alignment application. In operation, the camera 61 generates a value of each image pixel based on analog intensity of the sensed light at the point in the image corresponding to the pixel. The value is digitized and read out to circuitry on the main printed circuit board 75. The value may be digitized either on or off of the camera sensor chip.

In this implementation, the spatial relationship sensor module 65 comprises an aperture 86 and a linear image sensor 87 such as a charge-coupled device (CCD) or CMOS unit. An IR LED is provided to project a beam of light toward a similar toe sensor module in the opposite head 57. In a similar manner, the opposite head 57 includes an IR LED that projects a beam of light toward head 55.

The IR light/radiation from the IR LED of the opposing head 57 is sensed by the linear image sensor 87, via the aperture 86. The precise point on the sensor 87 at which the IR light from the other head is detected indicates the relative angle of incidence of the light from the opposite head at the sensor 87 in the head 55. In a similar fashion, the IR light/radiation from the IR LED of the head 55 is sensed by the linear image sensor, via the aperture in the opposite head 57; the precise point on the opposite linear image sensor at which the IR light from the LED is detected indicates the relative angle of incidence of the light from the head 55 at the linear sensor in head 57. Processing of the angle detection data from the two linear sensors enables determination of the angular relationship between the optical camera axes of the cameras 61 and 63 in the two active sensing heads.

The circuit board 75 includes a data processor 89 and an associated data/program memory 91. The data processor 89 may be implemented as a single chip or a set of individually packaged chips. In operation, each camera 61, 63 supplies digital image data to the data processor 89. As shown, the active sensing head 55 also includes the camber tilt sensor 79 and the pitch tilt sensor 77. These inclinometer elements supply the gravity angle measurements (see discussion of FIGS. 4 and 5) to the processor 89. The processor 89 performs one or more operations on the data and supplies the data for transmission to the host computer system 100.

The image processing operations of the data processor 89 may involve formatting various data for communication. Alternatively, the processor 89 may implement some degree of pre-processing before transmission to the host computer system 100. With regard to the image data, image pre-processing may include gradient computation, background subtraction and/or run-length encoding or other data compression (see e.g. U.S. Pat. No. 6,871,409 by Robb et al.). The processor 89 may also process the image data to some degree in response to the tilt data from the tilt sensors 77, 79 and/or the spatial relationship measurement data. Alternatively, the tilt and cross position data may simply be forwarded to the host computer for use in further processing of the image data.

The processor 89 in one of the active heads may be configured to receive data from the other head and perform wheel alignment parameter computations, internally, and then send only the vehicle measurement results to the host computer system 100. Moreover, processor 89 in one of the active heads may be configured to calculate all alignment values and also generate the user interface. In this case, the active head may act as a web server to serve web pages that implement the user interface for the wheel alignment system, and the host computer may consist of any general purpose computer with a web browser and no wheel alignment specific software.

The processor 89 or another controller (not separately shown) on the board 75 also provides control over operations of the active sensing head 55. For example, the control element (processor 89 or other controller) will control the timing and intensity of emissions by the LED array 83 and the IR LED as well as the timing and possibly other operational parameters of the camera 81 and the linear image sensor 87. The control element may perform power management to selectively shut down or reduce power supplies to different elements or modules of the sensing head, in response to occurrence of prescribed events or inactivity of sensing heads, to reduce power consumption and to extend operation time. Details of the power management of sensing heads will be described shortly. The active sensing head 55 also includes a user interface 74 for communicating with a user, and the processor 89 or other controller will sense and respond to inputs via the user interface 74.

Two-way data communications are provided between the components of the active sensing head 55 and the host computer 100 (FIG. 2) and in some configurations between the active heads, conforming to one or more appropriate data protocol standards, to enable data communication to and from the host computer 100 at desired speeds and in a wireless manner. Those skilled in the art will recognize that other data communications interfaces may be used in wheel alignment systems, such as WIFI or wireless Ethernet, Zigbee, Bluetooth, UWB (Ultra-Wideband), IrDA, or any other suitable narrowband or broadband data communication technology.

Electronic circuits on board 75 as well as elements of image sensing module 81 and spatial relationship sensor module 65 receive power from a supply 94. If heads 55 and 57 are wireless, the power supply may utilize power storage media, such as rechargeable or disposable batteries, or supercapacitors. If needed, the system 50 may use cables, to supply power and transmit signals to and from the heads 55 and 57, in case the wireless transmission is not working properly or power storage midis run out of power. The wired supply may run from a conventional AC power grid or receive power over USB or Ethernet cabling.

Returning to FIG. 2, host computer system 100 processes data from the active sensing heads 55, 57 and provides the user interface for the system 50. In the example, the system 100 may be implemented by a desktop type personal computer (PC) or other computer device such as a notebook computer, UMPC (ultra mobile PC), or similar device. A client server arrangement also could be used, in which case the server would perform the host processing and one of the active heads or another user device would act as a client to provide the user interface. Although those skilled in advanced wheel alignment technologies will be familiar with the components, programming and operation of various suitable computer systems, it may help to provide a brief example.

Computer system 100 includes a central processing unit (CPU) 101 and associated elements for providing a user interface. The CPU section 101 includes a bus 102 or other communication mechanism for communicating information, and a processor 104 coupled with the bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions. Although only one is shown, many computer systems include two or more storage devices 110.

The illustrated embodiment of the computer system 100 also provides a local user interface, for example, so that the system appears as a personal computer or workstation as might be used in a wheel alignment bay or an auto service shop. The computer system 100 may be coupled via bus 102 to a display 112, such as a cathode ray tube (CRT) or flat panel display, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104, which the CPU 101 in turn uses for controlling cursor movement on display 112. The cursor input device 116 typically has two degrees of freedom in two axes, a first axis (e.g., x) and a second axis (e.g., y), that allows the device to specify positions in a plane. The couplings between the user interface elements 112-116 and the CPU 101 may be wired or may use optical or radio frequency wireless communication technologies.

The CPU 101 also includes one or more input/output interfaces for communications, shown by way of example as an interface 118 for two-way data communications with the active sensing heads 55 and 57. For purpose of the wheel alignment application, the interface 118 enables the CPU to receive image data, spatial relationship measurement data and tilt data from the active sensing heads 55 and 57. Typically, the interface 118 also allows the host computer system 100 to send operational commands and possibly software downloads to the active sensing heads 55 and 57.

Although not shown another communication interface may provide communication via a network, if desired. Such an additional interface may be a modem, an Ethernet card or any other appropriate data communications device. The physical links to and from the additional communication interface(s) may be optical, wired, or wireless.

Although the computer 100 may serve other purposes in the shop, the alignment system 50 uses the computer system 100 for processing data from the heads 55, 57 to derive desired alignment measurements from the data provided by the heads, and to provide the user interface for the system 50. The computer system 100 typically runs a variety of applications programs and stores data, enabling one or more interactions via the user interface, provided through elements such as 112-116 to implement the desired processing. For wheel alignment applications, the programming will include appropriate code to process the data received from the particular implementation of the heads 55, 57, including computations to derive desired vehicle wheel alignment measurement parameters from the various data from the heads 55 and 57. The host computer 100 will typically run a general purpose operating system and an application or shell specifically adapted to perform the alignment related data processing and provide the user interface for input and output of desired information for alignment measurements and related services. Since it is a general purpose system, the system 100 may run any one or more of a wide range of other desirable application programs.

The components contained in the computer system 100 are those typically found in general purpose computer systems used as servers, workstations, personal computers, network terminals, and the like. In fact, these components are intended to represent a broad category of such computer components that are well known in the art.

At various times, the relevant programming for the wheel alignment application may reside on one or more of several different media. For example, some or all of the programming may be stored on a hard disk or other type of storage device 110 and loaded into the Main Memory 106 in the CPU 101 for execution by the processor 104. The programming also may reside on or be transported by other media for uploading into the system 100, to essentially install and/or upgrade the programming thereof. Hence, at different times all or portions of the executable code or data for any or all of the software elements may reside in physical media or be carried by electromagnetic media or be transported via a variety of different media to program the particular system and/or the electronics of the active sensing heads 55, 57. As used herein, terms such as computer or machine "readable medium" therefore refer to any medium that participates in providing instructions to a processor for execution. Such a medium may take many forms, including but not limited to, non-volatile media, volatile media, and transmission media (e.g. wires, fibers or the like) as well as signals of various types that may carry data or instructions between systems or between system components.

Runout compensation for the heads could be performed as with traditional conventional alignment heads by elevating the rear wheels and using the camber sensors to measure the runout vector then elevating the front wheels and using cameras to image the targets as they rotate about the front wheel's axis. An alternate method would be to avoid elevating the wheels by rolling the vehicle along the lift and performing the runout measurements on the heads with the inclinometers as the track cameras image the front targets as well as fixed targets on the lift, vehicle or other stationary object in order to establish the fixed coordinate system.

As noted, the rear heads 55, 57 incorporate inclinometer type tilt sensors to measure the relative camber and pitch angles of each rear head to gravity. Once runout is taken and the inclinometer angle values are measured, each head's orientation to gravity could be processed to relate each track facing camera's optical axis to gravity. Using the relationship of the track facing camera to gravity and the measured relationship of the front target to the track facing camera, the relationship of the front target to gravity can be calculated. A spatial relationship is measured by the sensors 65 and 67, to determine the spatial relationship between the track cameras 61 and 63.

Front toe, caster, and SAI would be measured using techniques similar to those embodied in an imaging aligner, such as the Visualiner 3D or "V3D" aligner, available from John Bean Company, Conway, Ark., a division of Snap-on Incorporated. The rear thrust angle, each rear individual toe, and the horizontal angular relationship of the track cameras to each other, would be derived from the measurements obtained by the rear spatial relationship sensors. The inclinometers would relate each track camera to each other through the common gravity vector references. With the track cameras effectively related to each other along the axis of the rear thrust line, each front target's location and orientation can be determined in a coordinate system that is directly related to the thrust angle and to gravity.

Calibration may be performed by mounting each rear head on a straight calibration bar in much the same way that the current conventional heads are calibrated. The bar is first rotated to compensate for runout. The zero offset of the rear spatial relationship sensors can then be set and by leveling the calibration bar, each camber sensor zero offset can be set. The pitch zero offset is set by leveling the head with a precision level bubble and recording the pitch inclinometer value. Enhanced camera calibration may be achieved by adding another calibration bar adapted to mount the front targets in view of the track cameras (see e.g. U.S. Patent Application Publication No. 2004/0244463 by James Dale, Jr.). After the initial calibration above is performed, the track cameras measure the orientation of the front targets as the targets and bar are rotated about the axis of the front calibration bar. The relationship of one camera to the other may be calculated and thus the relationship of each camera to the rear spatial relationship checked or calibrated. By leveling the front target calibration bar, the fixed relationship of each track camera to the local inclinometers may also be checked. This redundant check could possibly constitute an ISO check for customers that require measurement accuracy traceability.

In addition, small targets may be affixed to each front turntable allowing for an additional measurement or cross check of turn angle.

It will be readily apparent to someone skilled in the art that the wheel alignment systems discussed herein may be implemented with various different types of spatial relationship sensors. An image sensor is one type of spatial relationship sensor. An image sensor may consist of a camera with a two dimensional array of sensing elements that produces data representative of an image expected to contain a target within the field of view of the sensor. The data from the image sensor can be processed to determine position and orientation information related to the viewed target and thus the head, wheel or other object with which the target is associated. An example of a prior art image sensor is the camera used in the Visualiner 3D commercially available from John Bean Company, Conway, Ark., a division of Snap-on Incorporated. An angle sensor is another type of applicable spatial relationship sensor. An angle sensor produces data representing the angle from the sensor relative to a point. Various types of angle sensors are generally known. One example of an angle sensor is the linear CCD sensor as used in the Visualiner available from John Bean Company.

Figure 7:
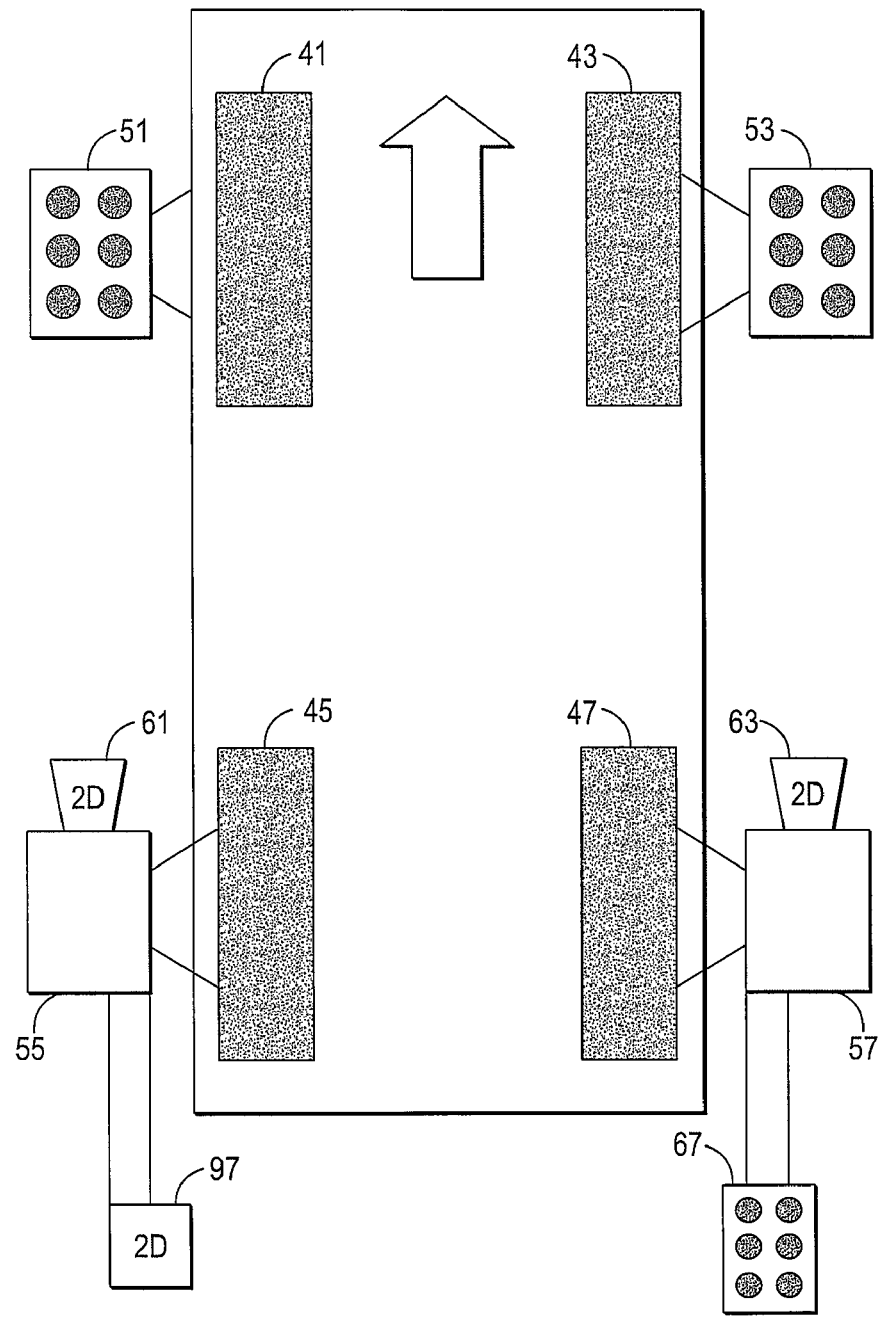
FIG. 7 diagrammatically illustrates another arrangement of targets and active sensing heads in relation to vehicle wheels, in this case using additional targets and image sensing for measurement of the spatial relationship between the active heads.
Figure 8:
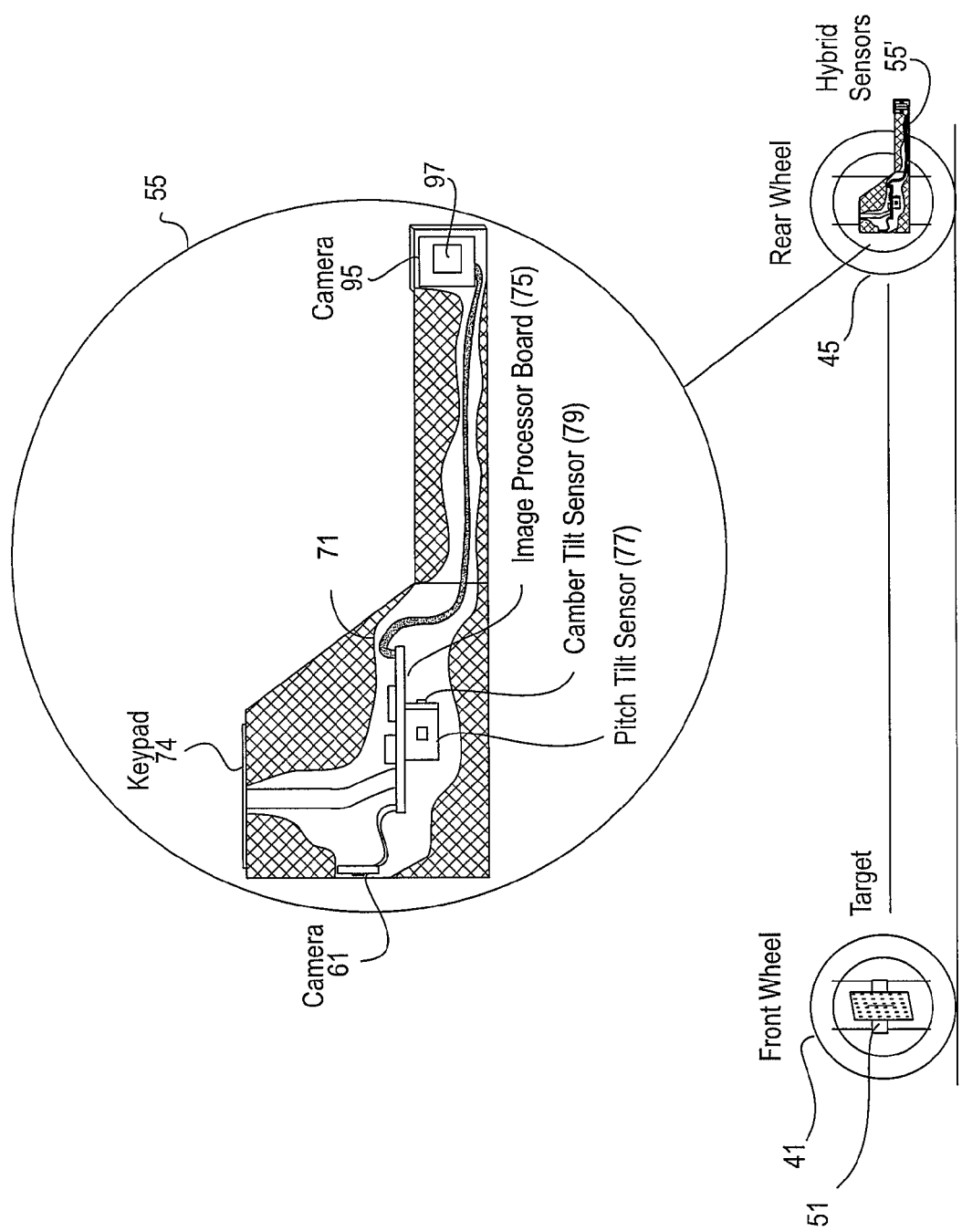
FIG. 8 is a side view of some of the wheel mounted components of the system of FIG. 7, with one of the active sensing heads shown in a partial cross-sectional detail view, generally like that of FIG. 3; but wherein the spatial relationship sensor utilizes another camera.
Figure 9:
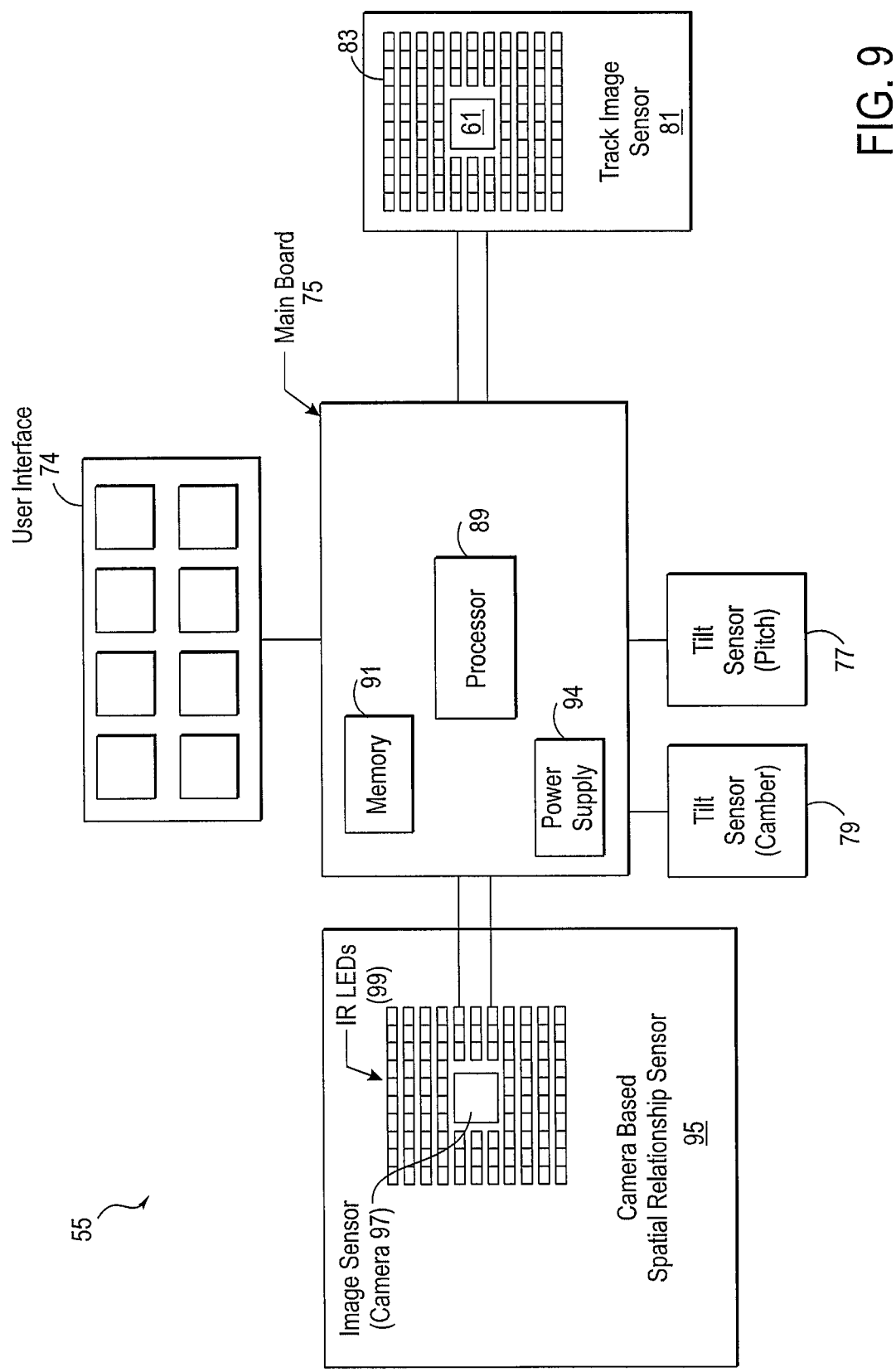
FIG. 9 is a functional block diagram of the components of an exemplary active sensing heads shown in the detail view in FIG. 7.

Hence, it may be helpful now to consider an example in which the aperture and linear image sensor style spatial relationship sensing arrangement described above relative to FIGS. 3 and 6 is replaced by an imaging type camera similar to the track camera. FIGS. 7 to 9 are views/diagrams similar to those of FIGS. 1, 3 and 6, except that the illustrations of this second implementation show such an alternate technology using a target and image sensor for the spatial relationship sensing function. Wheels and elements similar to those of the implementation of FIGS. 1, 3 and 6 are similarly numbered and are constructed and operate in essentially the same fashion as discussed above. This example uses passive two-dimensional targets 51 and 53 on the front wheels 41 and 43; and it uses active heads 55' and 57' on the rear wheels for the measurements alongside the vehicle tracks, much as in the example of FIG. 1. The rear active sensing heads use cameras 61, 63 or similar 2D image sensors to obtain images of the targets on the front heads 51, 53 and determine the relative positions and orientations of the targets with respect to the active heads, as discussed in detail above relative to FIG. 2. However, the spatial relationship of the two active heads 55', 57' is determined by at least one 2D image sensor 97, which obtains images of a 2D target 67' mounted on the opposite active head. In this example, the active head 57' has an associated target 67' similar to one of the targets on head 51 and 53, but the head 57' does not include a sensor for the spatial relationship measurement function. The active sensing head 55' uses an image processing type approach to the spatial relationship measurement across the rear of the vehicle based on imaging the target 67'. The image sensor 97 typically would be similar to the cameras or the like used as 2D image sensors in the example of FIG. 2.

As shown in more detail in FIGS. 8 and 9, the spatial relationship sensor 95 uses an image sensing module similar to the track facing image sensor module 81. The spatial relationship image sensing module 95 includes a digital camera 97 and an LED array 99. The LED array 99 serves as an illuminator. For the spatial relationship sensing application, the LED array 99 produces infrared (IR) illumination. The other rear head 57' includes an IR sensitive retro-reflective target 67' (FIG. 7) to be illuminated by the LED array 99, which in turn is sensed by the camera 97.

The spatial relationship camera 97 images the target 67' positioned on the companion head (across the rear of the vehicle) in place of the other spatial relationship sensor. Both cameras 61 and 97 could share a common processing board in the one head while the other head may simply use a single camera (for track) and a target (for cross). Processing of the target image obtained by camera 97 can compute the angular spatial relationship between the rear heads, in much the same way as the images from the active head cameras were processed to determine relative angle and/or position of the wheel mounted targets in the examples of FIGS. 1 and 2. Rather than measuring a spatial relationship angle as in the previous example, the image sensing module and associated image processing measures the 3D spatial relationship of the target on the opposite active head. For additional information regarding measurement based on processing of images of targets, attention again is directed to U.S. Pat. No. 5,724,743 to Jackson.

In the system of FIGS. 7 to 9, at least one active head contains gravity sensors to measure camber and pitch of the head. Since the imaging of the target mounted on the opposite active head allows the system to obtain a three-dimensional (3D) spatial relationship measurement between the two active heads, only one active head is required to have gravity sensors. Otherwise, the structure, operation and computations are generally similar to those of the earlier examples.

In the examples discussed above, the active heads have been associated with the rear wheels, and the targets have been associated with the front wheels of the vehicle. However, those skilled in the art will understand that there are many variations of the basic configurations discussed above. Also, there are a variety of different combinations of imaging sensors with other sensors for determining the spatial relationship that may be used. Several are described and shown below.

Figure 10:
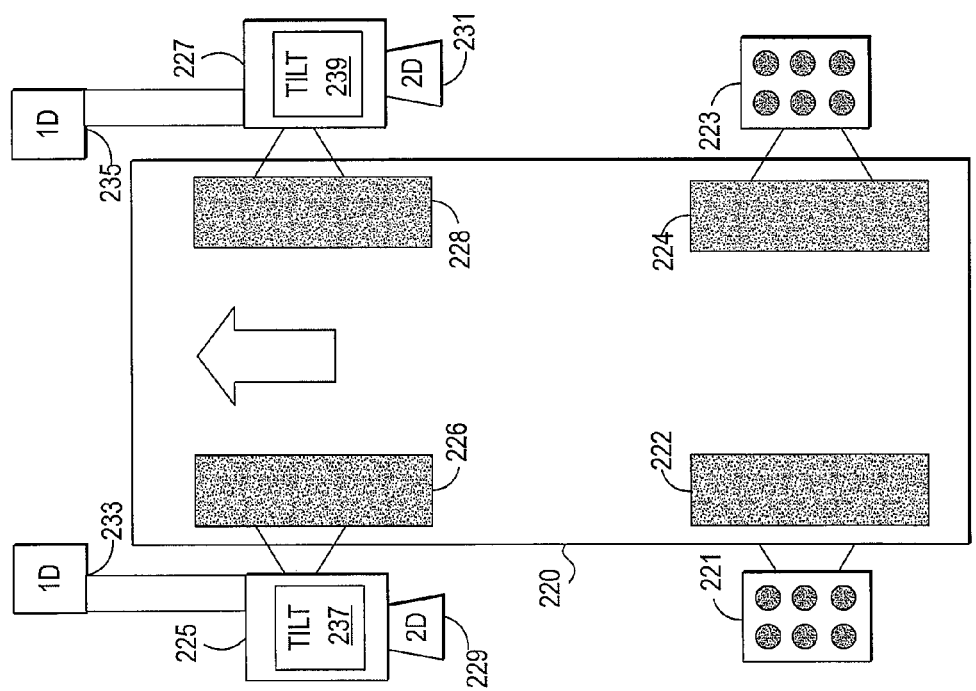

FIG. 10, for example, shows an arrangement similar to that of FIG. 1 in which the active heads and the target heads are reversed. The wheel alignment system of FIG. 10 includes a pair of passive heads 221 and 223 mounted on respective wheels 222 and 224 of the vehicle 220, which are rear wheels in this example. The active sensing heads 225 and 227 are adapted for mounting in association with the respective front wheels 226 and 228 of the vehicle 220. Again, each active sensing head includes an image sensor 229 or 231 for producing image data, which is expected to include an image of a passive target when the various heads are mounted to the respective wheels of the vehicle. In this example, the image sensors 229 and 231 in the active sensing heads 225 and 227 are two dimensional (2D) imaging devices, e.g. cameras similar to the track cameras in the earlier examples.

The heads 221 and 223 are passive in that they include targets of a type that may be observed by one of the image sensors in the active heads 225 and 227, but they do not include any sensing elements. Typically, the targets comprise light and dark regions that can be detected when illuminated by other sources and imaged by cameras or the like in the active sensing heads 225 and 227.

As in the earlier examples, the system also includes a spatial relationship sensor associated with at least one of the active sensing heads 225 or 227. The spatial relationship sensor enables measurement of the spatial relationship between the active sensing heads 225 and 227 when the active sensing heads are mounted on wheels of the vehicle. In this example, the system uses two conventional (1D) angle sensors 333 and 335 to measure the relative angles of the active sensing heads 225 and 227, in the toe plane. The active heads 225 and 227 also contain gravity sensors or the like to measure tilt, typically camber and pitch, of the head. Hence, the head 225 includes one or more tilt sensors 337; and the head 227 includes one or more tilt sensor 339.

As shown in the earlier examples (e.g. FIG. 2), the system also includes a computer. The computer processes image data relating to observation of the targets and tilt data, from the active sensing heads. The computer also processes spatial relationship data from the at least one spatial relationship sensor. The data processing enables computation of at least one measurement of the vehicle.

As noted, this example is essentially a front-to-rear reversal of the target/active sensing head positions from that of the example of FIG. 1. Although not all variants are shown, those skilled in the art will understand that similar types of front-to-rear variants and/or left-to-right variants can also be implemented for every other alternative arrangement discussed herein.

Figure 11:
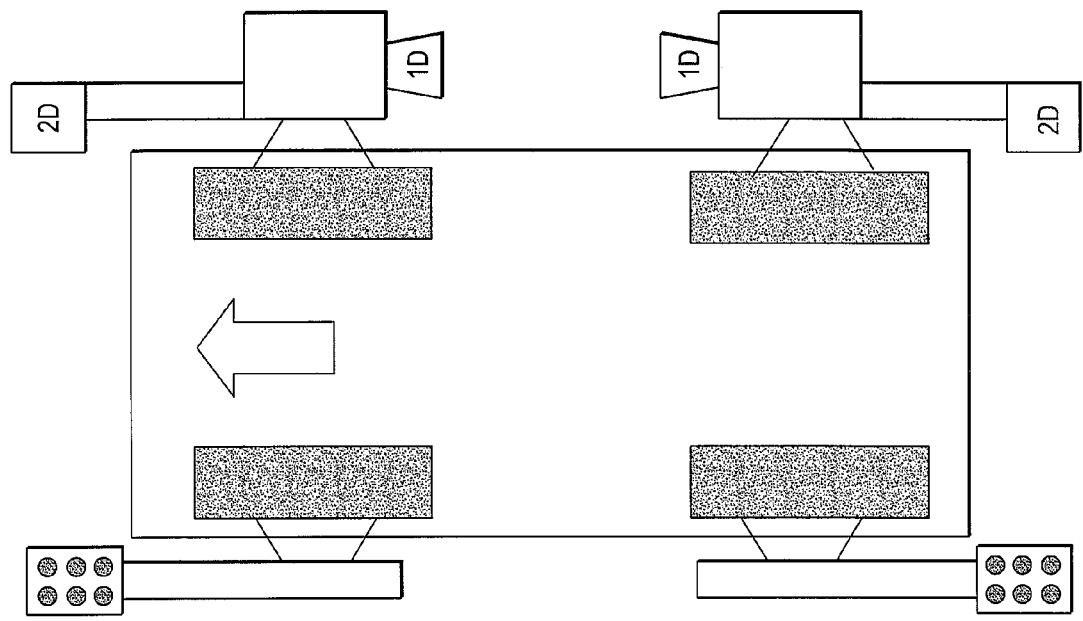
FIGS. 10 to 18 diagrammatically illustrate a series of alternative arrangements, having various heads/targets associated with different combinations of the vehicle wheels and using various different configurations or equipment for spatial relationship sensing.

FIG. 11 illustrates another alternative arrangement. In this example, two active sensing heads are mounted on one side of the vehicle, and two passive sensors are mounted on the opposite side of the vehicle. As shown, the mounting of the targets on the passive heads provides an extension out away from the wheels, somewhat, so as to allow the image sensors in the active heads to see and image the targets. Each active head contains an image sensor that obtains images of a target attached to the corresponding wheel on the opposite side of the vehicle. As in the earlier examples, each active head contains gravity sensors to measure camber and pitch of the head. Here, the spatial relationships of the two active heads are determined by two conventional angle sensors measuring the toe plane angles between the two heads. Since the structure, operation and computations are generally similar to those of the earlier examples, those skilled in the art should understand the example of FIG. 11 without a more detailed discussion here.

Figure 12:
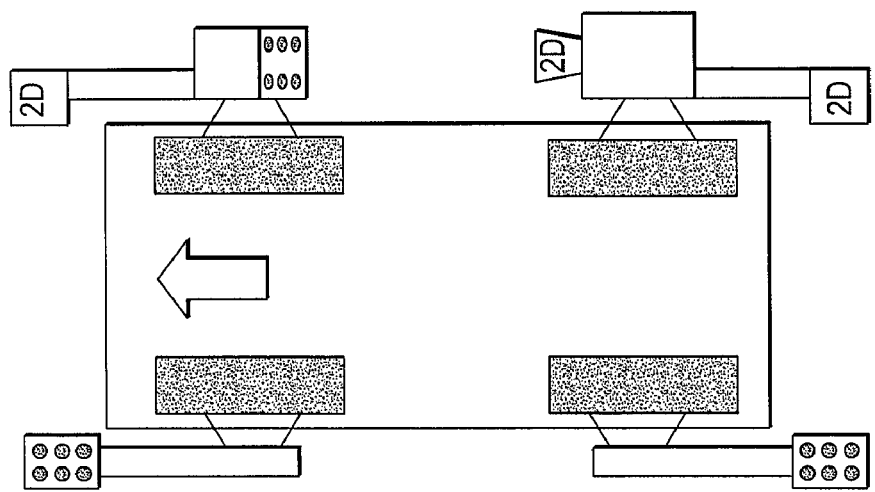

FIG. 12 illustrates another alternative arrangement. In this example, two active sensors are mounted on one side of the vehicle, and two passive sensors are mounted on the other side of the vehicle. Each active head contains image sensors that obtain images of targets attached to the corresponding wheel on the opposite side of the vehicle. Here, the spatial relationships of the two active heads are determined by one or more image sensors that obtain images of a target mounted on the opposite active head. In the example, the front active head includes a target, and the rear active head includes a 2D imaging sensor for obtaining images of that target, in a manner analogous to the 3D spatial relationship measurement in the example of FIGS. 7 to 9. At least one active head contains gravity sensors to measure camber and pitch of the head. Since this system obtains a 3D position and orientation measurement between the two active heads, only one active heads is required to have gravity sensors. Again, since the structure, operation and computations are generally similar to those of earlier examples, those skilled in the art should understand the example of FIG. 12 without a more detailed discussion here.

Figure 13:
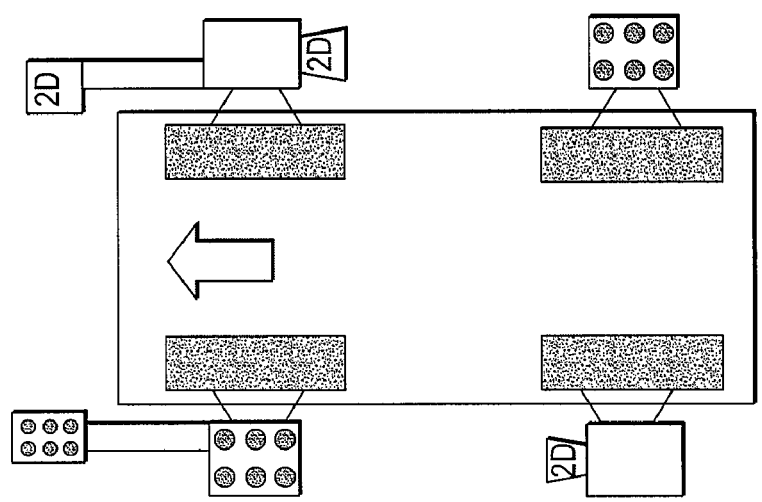

FIG. 13 is yet another alternative arrangement. This example uses a first active sensing head containing a single 2D image sensor for obtaining images of a passive target on a first passive head mounted on the other wheel on the same side of the vehicle. The first passive head is mounted to a wheel on the same side of the vehicle as the first active head. In the specific example shown in the drawing, the first active head is mounted on the left rear wheel, and the first passive head is mounted on the left front wheel. One target on the first passive head is available for imaging by the 2D image sensor associated with the left rear wheel, that is to say, along the vehicle track on that side of the vehicle.

However, the first passive head also contains a second passive target in a known relative position with respect to its first passive target. The second passive target is extended in front of the wheel so that it can be viewed by a corresponding 2D image sensor on the opposite side of the vehicle, for imaging in a spatial relationship measurement. Hence, the second active head is mounted across from the first passive head, that is to say on the right front wheel in the illustrated arrangement. The second active head contains two 2D image sensors. One of these sensors obtains images of the target mounted on the first passive head, attached to the opposite (left front) wheel for the spatial relationship measurement. The other 2D image sensor in the second active head obtains images of the target mounted on a second passive head, which is mounted on the same side of the vehicle, that is to say, on the right rear wheel in this example. The second passive head contains a single target, and that head is mounted across from the first active head.

In the arrangement of FIG. 13, at least one of the active heads contains gravity sensors to measure camber and pitch of the head. Since the system obtains a 3D position and orientation measurement between the two active heads, only one active heads is required to have gravity sensors. In general, the details of implementation and operation of the system of FIG. 13 should be apparent from this summary discussion and the earlier detailed disclosure of the examples of FIGS. 1-9.

Figure 14:
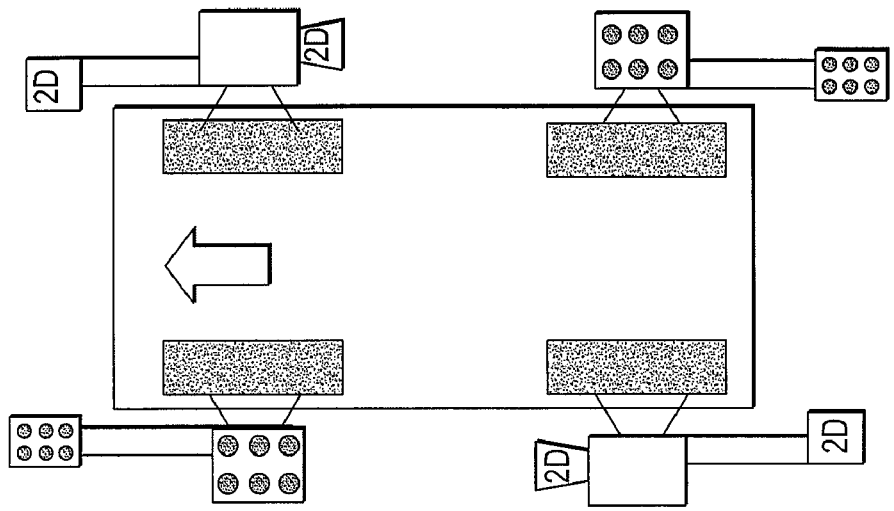

The example illustrated in FIG. 14 is generally, similar to the example of FIG. 13, except that in the system of FIG. 14, the first active head also contains a second image sensor. The second image sensor in that head obtains an image of a second target attached to the second passive head. This configuration has an advantage over the arrangement of FIG. 13 in that it only requires two unique head hardware configurations rather that four. Both active heads are the same, and both passive heads are the same. Each of the active heads would be similar to the head 55' shown in FIGS. 8 and 9. One active head should be identified as a front head and the other as a rear head. This can generally be done with firmware in the embedded processors.

A second advantage of this configuration (FIG. 14) is that the second spatial relationship measurement is redundant information that is not required to calculate wheel alignment. This redundant information can be used as a calibration check on the system. If both active heads contains gravity sensors, both camber and toe can be validated. If only one active head contains gravity sensors, only the toe calibration can be validated.

Figure 15:
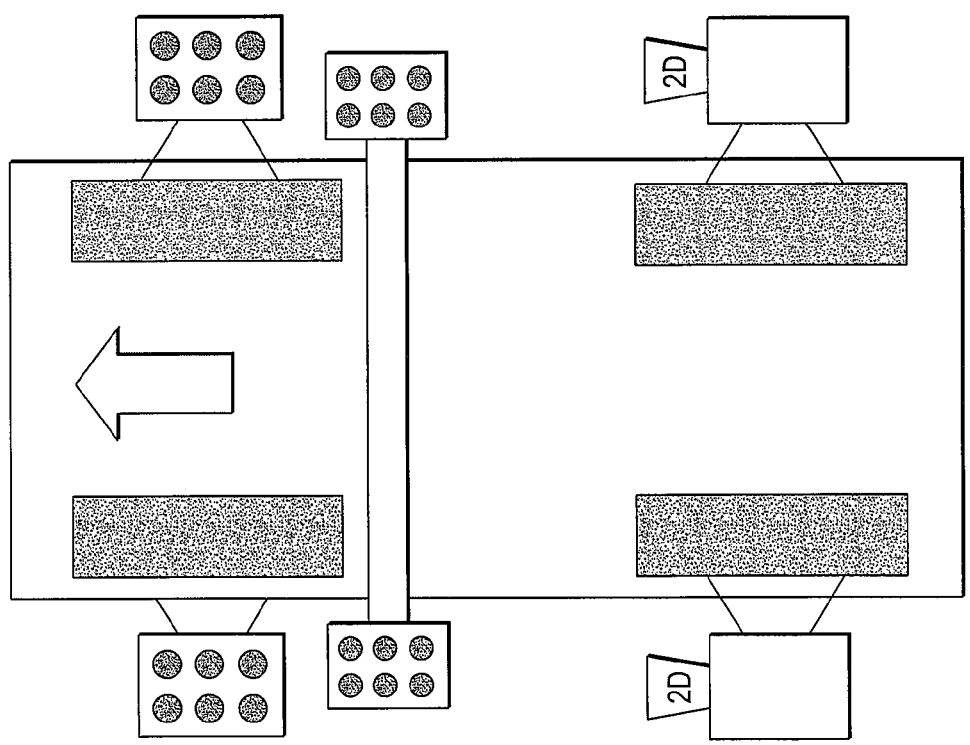

In the example shown in FIG. 15, the system uses passive heads with targets that are mounted on each of the front wheels, essentially as in the examples of FIGS. 1-9. Active heads, shown on the rear wheels, contain 2D image sensors. A reference bar with a target on each end is placed such that each active head can view one of the targets on the reference bar as well as the target on the front wheel of the same side of the vehicle. The relative positions and orientations of the two targets on the reference bar are known. The system can find the spatial relationship of the two active heads from the measured 3D positions and orientations of the two reference targets by the active heads and the known relationship of the two reference targets. This provides the spatial relationship information obtained by the spatial relationship sensor—target of the example of FIGS. 7 to 9. Since the reference targets are fixed in position they can also be used as a reference for measurements during rolling runout. Those skilled in the art should appreciate the detailed structure and operations of this example, from the drawing, this description and the earlier discussion of other similar examples.

Figure 16:
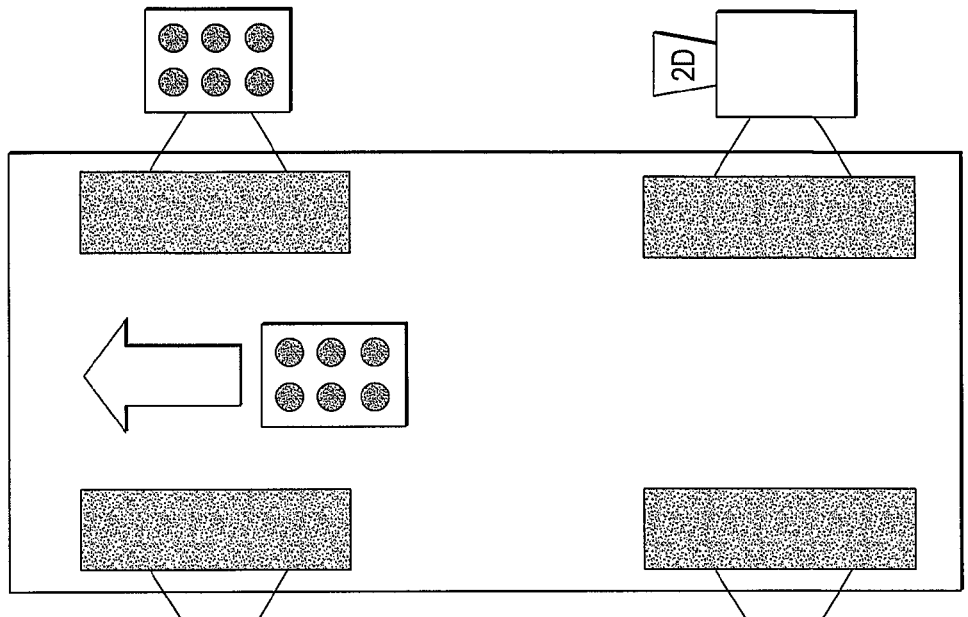

The example illustrated in FIG. 16 generally works just like the example of FIG. 15, except there is only a single reference target. The viewing angle of the image sensors in the active heads must be wide enough to be able to view both the passive head target on the same side of the vehicle and the single reference target.

Figure 17:
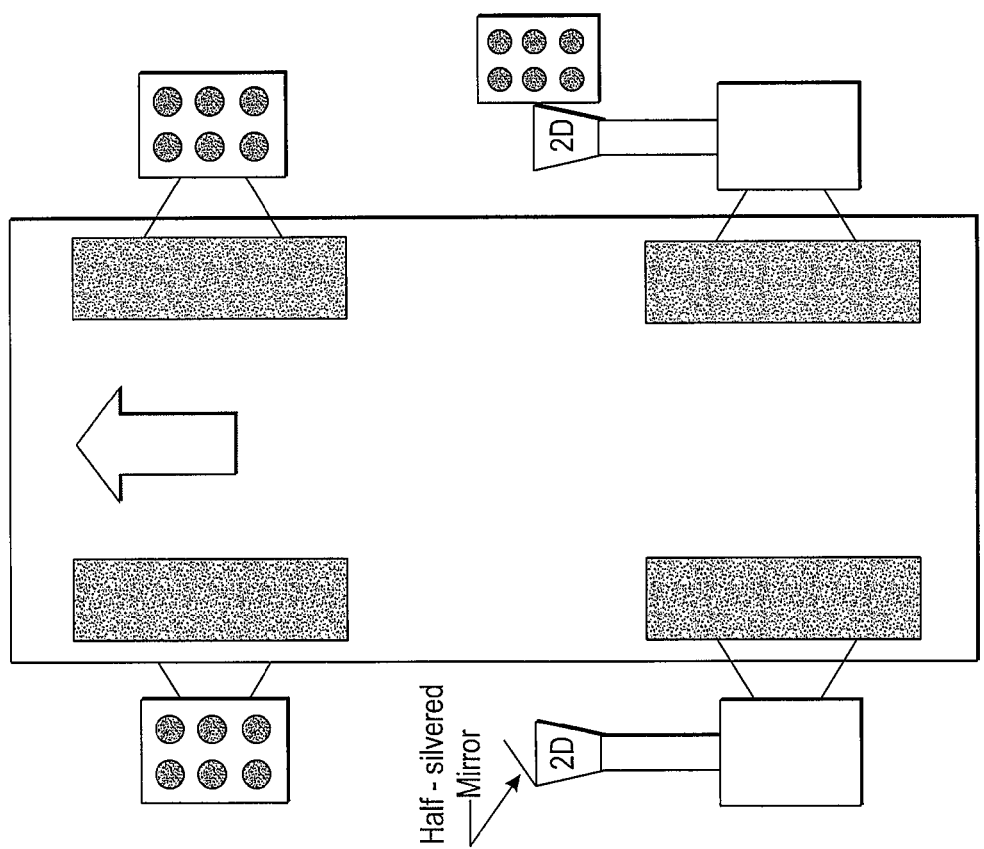

FIG. 17 illustrates yet another example of an exemplary wheel alignment system. Here, the system uses passive heads with attached targets mounted on each front wheel. The active heads are mounted on the rear wheels, as in several of the earlier examples. Each active head contains a 2D image sensor to obtain images of the passive head target on the respective side of the vehicle.

The image sensors are extended forward from the center of the rear wheels so that the sensors are located forward of the rear wheel tires, so as to provide a cross-vehicle line of sight under the vehicle. One of the image sensors, in the example the sensor on the active head mounted on the left rear wheel, contains a partial mirror that passes images from the passive target or reflects images from a target mounted on the corresponding active head on the other side of the vehicle. The operations of the mirror are shown in more detail in FIG. 19.

Light from the passive target on the passive head mounted on the same side of the vehicle, that is to say, on the left front wheel in the illustrated arrangement, passes directly through the half-silvered mirror to the 2D image sensor on the active sensing head mounted on the left rear wheel. Light from the passive target on the opposite active head, that is to say on the active head mounted on the right rear wheel in the illustrated arrangement, arrives at an angle to the partially reflective side of the mirror and is reflected into the 2D image sensor on the active sensing head mounted on the left rear wheel. The advantage of this system is that it eliminates one image sensor by allowing one of the sensors to view two different targets.

For further details of exemplary arrangements and combinations of alignment cameras and targets, attention is directed to a co-pending patent application Ser. No. 11/487,964, titled "VEHICLE WHEEL ALIGNMENT SYSTEM AND METHODOLOGY," commonly assigned to the assignee of this application, the disclosure of which is incorporated herein by reference in its entirety.

Figure 19:
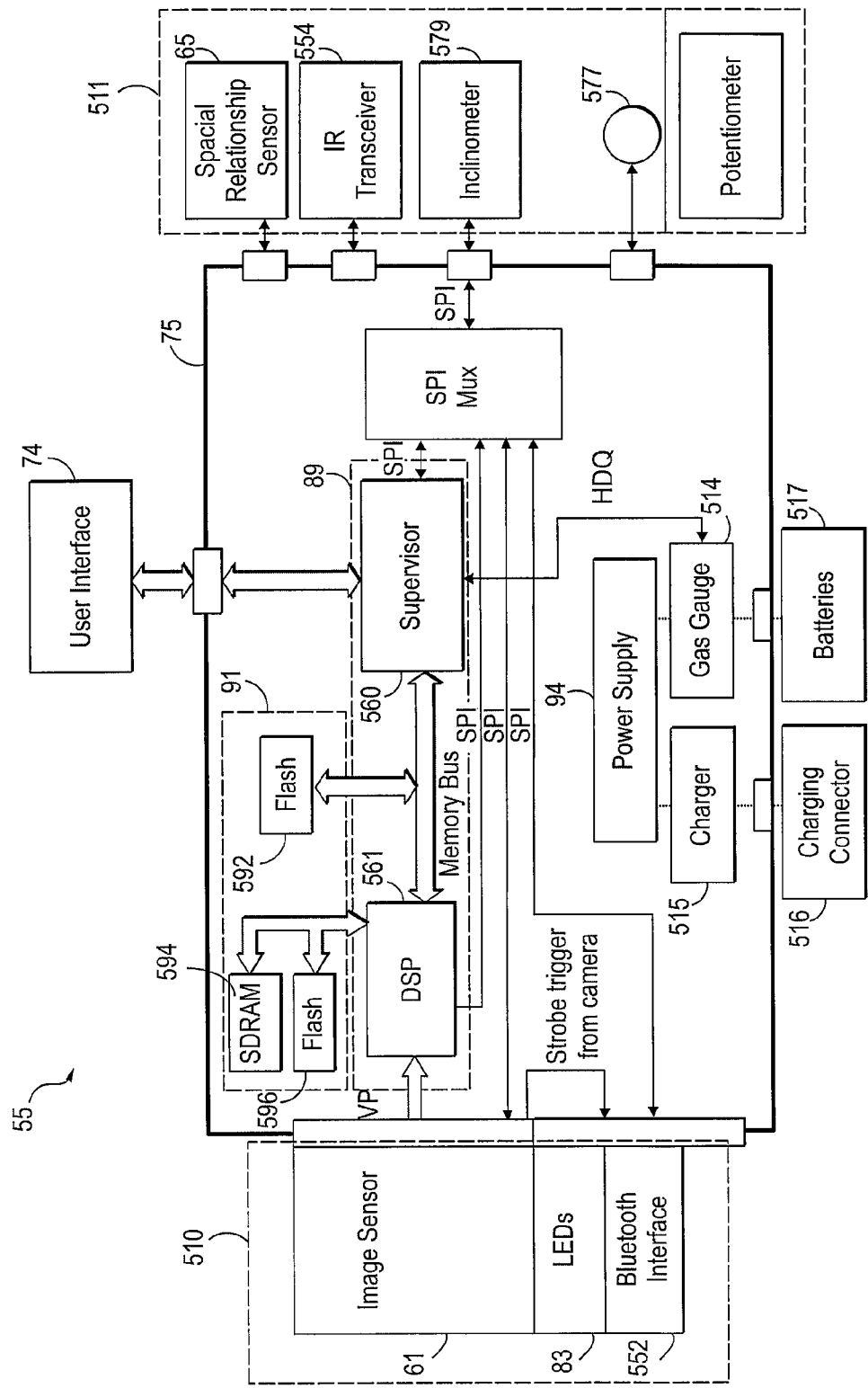
FIG. 19 shows a detailed functional block diagram of an exemplary alignment head.

FIG. 19 is a detailed functional block diagram showing an exemplary sensing head that provides advanced power management. For purpose of explanation, detailed operations of the advanced power management are discussed based on the structure of the sensing head shown in FIG. 6. However, it will be readily apparent to someone skilled in the art that the power management discussed herein may be implemented with various different types of sensing heads or alignment systems including those disclosed herein as well as other variations, such as image or non-image based wheel alignment systems using sensors or heads remote or attached to the wheels of a vehicle to measure various angles of the wheels and suspension.

The exemplary sensing head 55 includes a circuit board 75 and a user interface 74 for communicating with a user. The user interface 74 includes input and/or output devices such as keypad, control buttons, switches, display, touch screen input, voice recognition, LEDs, speakers, etc. As previously discussed relative to FIG. 6, the printed circuit board 75 includes a data processor 89, a memory device 91 and a power supply 94. The circuit board 75 couples to one or more peripheral devices 510, 511. Each peripheral device includes one or more functional modules for performing respective designated functions, such as wireless transmissions, detection of spatial relationships relative to other sensing heads, illuminations, image capturing, detection of spatial characteristics of wheels, etc. Each functional module includes one or more controllers to control the operation of the module.

For instance, the peripheral device 510 includes a camera module 61 implemented with image sensors, such as a charge-coupled device (CCD) or CMOS unit; an LED array module 83, serving as an illuminator, to emit light for desired illumination of the target mounted to the vehicle wheel on the same side of the vehicle; and a wireless communication module 552 comport to Bluetooth standard to perform wireless communications with a host computer system 100. The host computer system may be implemented as a stationary computer system or a portable computer system, such as a notebook or handheld computer, ultra mobile PC (UMPC) PDA, smart phone, etc. The host computer system may also be implemented as part of a sensing head. The peripheral device 511 includes a spatial relationship sensor module 65 using a beam angle detection technology, discussed previously with regard to FIG. 6, to detect relative spatial relationships between the active sensing heads 55 and 57; a tilt sensor module 579 implemented with a MEMS type inclinometer for measuring camber and sensing device pitch; a potentiometer module 577 implemented with a rotary potentiometer to encode the angle of the shaft of the sensing device 55 relative to the wheel/wheel clamp assembly; and an IR transceiver module 554 for forming a communication path for sending and receiving measurements data to sensing head 57, as discussed with regard to FIG. 2.

While the functional modules illustrated in FIG. 19 are described based on the sensing head shown in FIG. 6, it is known to people skilled in the art that the selection and combination of functional modules and peripheral devices are not limited to those shown in FIGS. 9 and 19. Rather, various types or different combinations of peripheral devices and/or functional modules may be used to implement different types of sensing heads with different functions.

Each functional module is capable of operating in at least two different modes: a normal operation mode performing a respective function corresponding to each functional module, and at least one sleep mode that consumes less power than the normal operation mode by reducing non-essential power usage of the entire or only portions of the functional module. In one embodiment, a functional device has multiple sleep modes that provide different levels of power saving. Details of the operations and control of the operation modes will be described shortly.

(1) The Data Processor

According to one embodiment, tasks related to power management mainly are handled and performed by the data processor 89. The data processor 89 includes a supervisor processor 560 and a DSP controller 561. The supervisor processor 560 handles system management tasks, such as power management, data communications, system integrity and user interface. The supervisor processor 560 utilizes Host Port Interface (HPI) to communicate with the DSP controller 561. Each module couples to the supervisor processor 560 using a Serial Peripheral Interface (SPI), via a SPI multiplexer. The SPI multiplexer is a programmable logic device (CPLD) designed to ensure the isolation of each SPI interface from each other SPI interface and the supervisor processor 560. In this way, no one faulty module can cause signal contention and failure of the shared SPI interface to the supervisor processor 560. The supervisor processor 560 may be implemented using an ARM 9 microcontroller, available from Atmel Corporation of San Jose, Calif.

The DSP controller 561 executes firmware independent of the supervisor processor 560, and is in charge of processing image data received from the camera module 61 and deriving the target plane orientation. In one embodiment, the DSP controller 561 also determines image integrity when the self-test feature is invoked to have the image sensor generate a test image. The DSP controller 561 may be implemented using a video/imaging processor TMS320DM642 from Texas Instruments Incorporated.

(2) The Camera Module

The camera module 61 may be implemented with an Omnivision OV9121 image sensor with 1280×1024 pixel image resolution, available from Omnivision of Sunnyvale, Calif. The image sensor setup, exposure time, gain settings and image acquisition is controlled by an image controller (not shown), such as a Freescale MC9S08 microcontroller available from Freescale Semiconductor, Inc. of Austin, Tex. The image controller communicates with the supervisor processor 560 via the SPI communications bus. The supervisor processor 560 may command the camera module to take both a background frame (no illumination) followed immediately by an illuminated frame or simply one or the other types of frames. The image data obtained by the image sensor are coupled to a video port of the DSP controller 561, where images are acquired at predetermined rates, such as 24 or 48 MegaPixels/sec. In one embodiment, the image controller also monitors various functions of the image sensor, temperature, image frame pixel count and power supply voltages to ensure proper operation of the camera module. Any failures or variances from nominal will be reported by the image controller to the supervisor processor 560 via the SPI interface. In another embodiment, the image sensor can be commanded by the image controller to generate an overlay test pattern. The DSP controller 561 may analyze this test image to evaluate the image sensor functional integrity.

(3) The LED Array Module

The LED array module 83 performs image illumination (strobe), controlled by an illumination controller (not shown), which may be implemented with a Freescale MC9S08 microcontroller, available also from Freescale Semiconductor, Inc. The LED array module 53 includes two sets of high efficiency, high output infrared LEDs. Two constant current power supplies deliver current to each set independently. In normal operation, only one set of LEDs is required. Each set of LEDs can be used alternately thereby increasing the lifetime of each set of LEDs. In addition, failure of an LED or a power supply will only limit the use of the sensing device and does not render the sensing device entirely unusable. The illumination controller communicates with the supervisor processor 560 via the SPI bus to setup and control image illumination. A strobe signal from the camera module 61 is utilized by the LED array module 83 to synchronize image illumination with the image sensor exposure duration. In one embodiment, the illumination controller monitors various parameters and operations of the illumination module 83, such as temperature, power supply voltages and LED current to ensure proper operation. Any malfunction or deviation from a preset range or level is reported to the supervisor processor 560 by the illumination controller via the SPI bus.

(4) The Wireless Communication Module

The wireless communication module 552 comports to one or more wireless communication standards, such as the Bluetooth standard, and performs wireless communication with the host computer system 100. An antenna, such as a Centurion D-Puck high gain antenna, is provided to transmit and receive wireless signals. A communication controller (not shown), such as a MC9208 microcontroller from Freescale, bridges the standard Bluetooth HCI UART interface of the communication module 552 with the SPI bus. In one embodiment, the communication module 552 is programmed to enter the Bluetooth defined Hold, Sniff or Park modes to conserve power during times of low usage. In another embodiment, the communication controller monitors various functions and/or parameters of the communication module 552, such as radio interface communications and power supply voltages to ensure proper operation. Any malfunctions and/or failures or variances from nominal are reported to the supervisor processor 560.

(5) The Spatial Relationship Sensor Module

Figure 18:
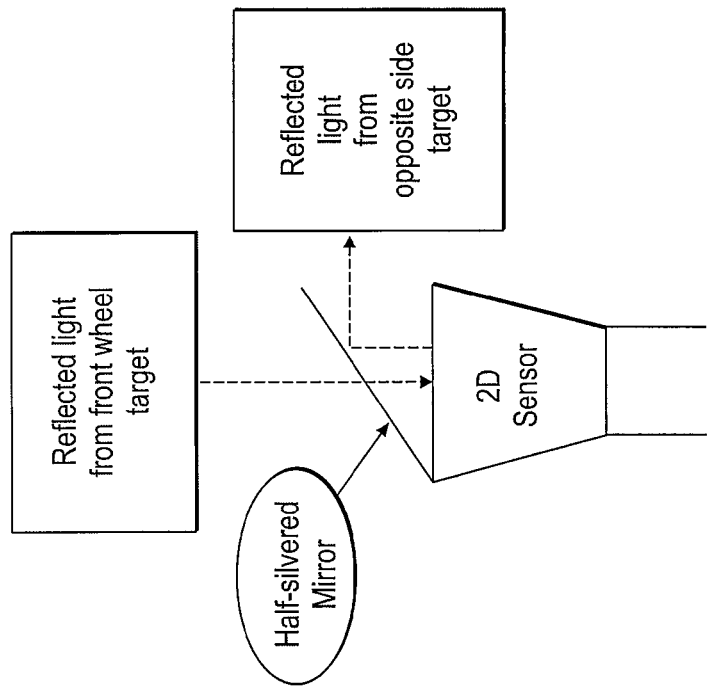

As discussed earlier relative to FIGS. 2, 6 and 18, the spatial relationship sensor module 65 accurately measures the horizontal angular relationship (cross toe) between sensing devices 55, 57. An image sensor, such as a linear CCD sensor with a 3648 pixel linear CCD, is disposed behind a slit or mask. A sensor controller (not shown), which may be implemented with a low power ARM 7 microcontroller, available from Atmel Corporation, is provided to perform complex CCD timing and data acquisition. In one embodiment, in response to any activities of the spatial relationship sensor module 65 during a sleep mode, the sensor controller may send out an interrupt signal to interrupt and wake the supervisor processor 560, while the SPI interface is not active, by toggling the SPI bus slave out data line (MISO). The sensor controller monitors various functions such as LED current and power supply voltages to ensure proper operation of the spatial relationship sensor module 65. In one embodiment, a test LED is placed inside the slit mask cavity (behind the mask). The test LED is designed to illuminate the entire CCD on the same sensing head, in-order to perform a pixel by pixel self-test. Pixels that deviate significantly from nominal or predetermined ranges or levels are flagged as weak or ineffective pixels. Data obtained from the flagged pixels are compensated for or thrown out during angle calculations. Factory and field calibration factors may be stored in the sensor controller internal flash memory and include checksums for data integrity. Any failures or variances from nominal will be reported by the sensor controller to the supervisor processor 560 via the SPI interface.

(7) The IR Transceiver Module

The IR transceiver module 554 is configured to establish a wireless communications link with the IR transceiver module of the other sensing head 57. The wireless communications link is based on the standard RS-232 protocol with each bit encoded into IR light burst modulated on a 500 KHz carrier frequency. The IR communications link can autonomously receive and transmit data even while the sensing head is in a sleep mode. It is understood that other types of wireless communications technology may be utilized to implement the wireless communications link between two sensing heads.

The sensing head 55 utilizes the IR communications link to synchronize the sensor controller real time clock of the spatial relationship modules in the sensing heads 55, 57. In this way, the sensing head can perform alignment data acquisition cycles in a known relationship to the companion sensing head. In another embodiment, a sensing head may send a command via the IR communications link requesting the spatial relationship sensor on the companion sensing head begin a toe sensor data acquisition cycle based on a specific time or immediately upon an external trigger.

In still another embodiment, the wireless communication link between the companion sensing heads provide a redundant data transmission path to the host computer system 100. The sensing head 55 sends the companion sensing head, via the IR transceiver module 554, a duplicate copy of data that the sensing head 55 generates and sends to the host computer system 100 via the companion sensing head's wireless communication module. At the companion sensing head, the duplicate copy of data is combined with data sensed and generated by the companion sensing head, and the combined data is sent to the host computer system 100 via the wireless communication module of the companion sensing head. In this way, each radio communication contains all the data from both sensing head. This improves communication reliability should any wireless communication modules of the companion sensing heads become intermittent or fail.

(8) The Tilt Sensor Module

The tilt sensor module 579 may be implemented using a two-plane, MEMS type inclinometer, capable of measuring both camber and sensing head pitch. Tilt controllers (not shown), such as a set of two Texas Instruments MPS430 ultra low power microcontrollers, each with an integrated temperature sensor and integrated SPI bus interface, are provided to process and communicate the angle data from the inclinometer to the supervisor processor 560 via the SPI interface.

The MEMS inclinometer is configured to perform a self test which deflects the internal micro-machined silicon beam by a constant amount. Evaluating this deflection by measuring the angle output change can determine if the inclinometer is defective or out of calibrations. Any failures or variances from nominal will be reported to the supervisor processor 560, to indicate an error in the respective module.

In one embodiment, an output from the inclinometer detecting a sensing head pitch is used to awake the sensing head to exit from the sleep mode and enter into a normal operation mode. The inclinometer pitch output is constantly monitored by the corresponding tilt controller. If a predetermined level of change occurs, signaling vibrations or activity around the vehicle or the sending head, the tilt controller toggles the SPI bus slave out data line (MISO) while the SPI interface is not active to interrupt and wake the supervisor processor 560 from the sleep mode.

According to another embodiment, during low or no activity (angle changes), the supervisor processor 560 successively reduces the frequency of data acquisition cycles that are used to retrieve data from the tilt sensor module and/or other functional modules. Between cycles, the supervisor processor 560 and other functional modules may enter into a sleep mode with most of the power supplies shut down for long periods of time. The inclinometer can detect very slight movements of the sensing head 55 indicating potential activity around the vehicle. Upon detecting this movement, the tilt controller signals the supervisor processor 560 to resume data acquisition cycles.

(9) The Potentiometer Module

A rotary sensor, such as a rotary potentiometer 577, encodes the angle of the shaft of sensing head 55 relative to the wheel/wheel clamp assembly. A potentiometer controller (not shown), which may be implemented using a Texas Instruments MPS430 microcontroller, converts the position detected by the potentiometer into shaft angle and communicates the angle data to the supervisor processor 560 via the SPI bus.

In one embodiment, factory and field calibration factors are calculated and stored in the tilt controllers and the potentiometer controller. Each controller monitors various functions and/or parameters including temperature and power supply voltages.

(10) The Bus and Interface System

As illustrated in FIG. 19, an exemplary sensing head of this disclosure utilizes a bus system complying with the SPI (Serial Peripheral Interface) standard, for performing communications between functional modules and the processor 89. A SPI multiplexer, which may be implemented using a programmable logic device, such as a CPLD (Complex Programmable Logic Device) or FPGA (Field Programmable Gate Array), is provided for coupling to the functional modules via slave SPI bus and to the processor 89 via a master SPI bus.

Figure 20:
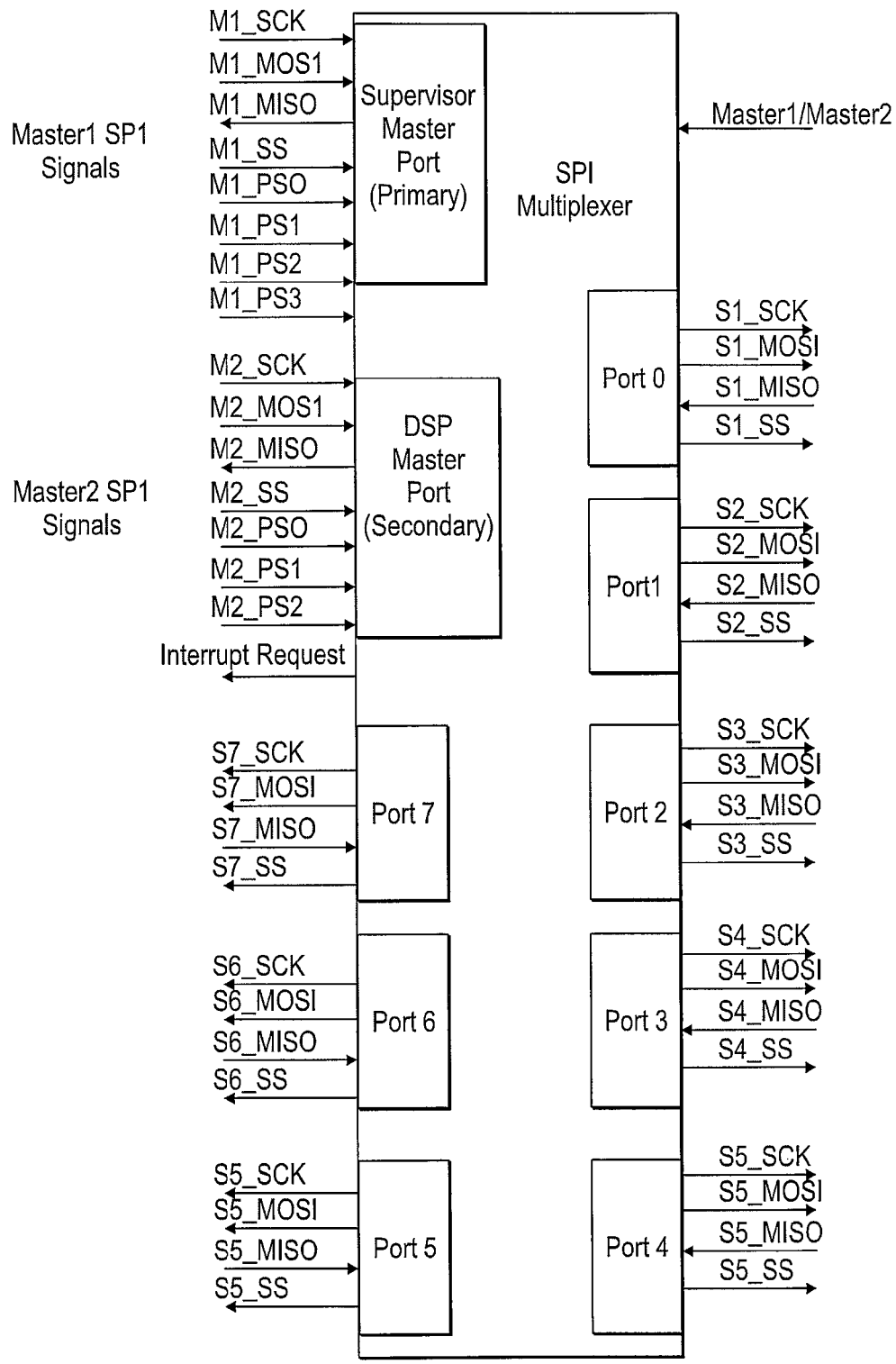
FIG. 20 is an exemplary circuit diagram of an exemplary SPI multiplexer.

FIG. 20 shows a block diagram of an exemplary SPI multiplexer. The SPI multiplexer provides seven slave ports (Port 0 through Port 7) for coupling to functional modules, and two master ports (primary master port and secondary master port), to optionally support multiple master controllers, such as the supervisor processor 560 and the DSP controller 561. Signal Master1/Master2 selects one of the supervisor processor 560 and the DSP controller 561 as the SPI master controller. In this way, a secondary controller, such as the DSP controller 561, can assume control of the sensing head 55 in the event that the supervisor processor 560 fails. Each master port has a system clock line (M1_SCK, M2_SCK), a data transmission indication line (M1_MOSI (master out slave in) and M2_MOSI) indicating that data is transmitting from a master port to a selected slave port, a data receiving indication line (M1_MISO (master in slave out) and M2_MISO) indicating data is transmitting from a slave port to a master port, and a set of address lines (M1_PS0-M1_PS3 and M2_PS0-M2PS3) selecting one of the functional modules coupled to the slave ports. Each slave port has a system clock line (S1_SCK-S7_SCK), a data receiving indication line (S1_MOSI-S7_MOSI) indicating that data is transmitting from a master port to a selected slave port, a data transmission indication line (S1_MISO-S7-MISO) indicating data is transmitting from a slave port to a master port, and a slave selection line (S1_SS-S7_SS), a state of which indicates whether a specific slave port is selected and active for data communications.

As described earlier, power supplied to the functional modules may be partially or completely shut down when not in use or during a sleep mode, based on a control signal issued by the supervisor processor 560. In a conventional design where multiple modules are directly connected to the SPI bus without the SPI muliplexer, any un-powered module may load the bus, which possibly results in higher current requirements to drive the bus signals, loss of bus signal integrity, or even total bus failure. In addition, in a conventional multi-drop configuration, the identity of a faulty module can be ambiguous to the processor 89. In the architecture shown in FIG. 20, the functional modules are isolated from each other and the bus system by the SPI multiplexer, and the modules may be shutdown as required without affecting the loading or integrity of the SPI bus. In addition, the master controller may sequentially address each module during power on self test to ensure that each module is functioning properly. If a module failure is discovered, the master controller can identify the failed module such as based on an address associated with the failed module.

Furthermore, as described earlier, the SPI bus system and the SPI multiplexer are also programmed to allow an unselected functional module to request connection to the master SPI bus by driving a specific signal line, such as the MISO signal. By altering the state of the MISO signal while a functional module is not selected, the functional module causes the SPI multiplexer to provide an interrupt request signal to the master controller. The master controller may service this interrupt request by querying the SPI multiplexer for the specific module address requesting connection, and then select that module for connections and data communications. While slave ports in the example shown in FIG. 20 utilize MISO signal lines to indicate a service request, it is understood that a separate, dedicated signal line may be used to signal the service request.

(10) The Power Supply and Charge Subsystem

As illustrated in FIG. 19, sensing head 55 includes a power supply and charge subsystem that provides power to the sensing head 55. The power supply and charge subsystem includes the power supply 94, a charger 515, a charging connector 516, a gas gauge 514 and a battery 517.

The battery 517 includes one or more power storage units, such as rechargeable batteries, disposable batteries, chemical batteries, fuel cells, capacitive power storage devices such as super capacitors, etc., or any combinations thereof. In one embodiment, the battery 517 includes one or more Lithium-Ion or Li-Pol battery packs.

If rechargeable batteries are provided, the batteries can be charged by connecting the charging connector 516 to an external power source such as an AC or DC source. The charger 515 controls and regulates the charging current and voltage suitable for charging the battery 517. The power supply 94 is provided to convert the power supplied by the battery 517 and/or an external power source to a level suitable for the sensing head 55.

The gas gauge 514 monitors, measures and calculates multiple battery parameters and operation status, and provides various types of information related to the battery and/or charging condition, including current, available capacity, time-to-empty, time-to-full, state-of-charge, cell temperature, voltage, charging status, discharge and charge currents, low voltage thresholds, etc., and compensates for self-discharge, aging, temperature, and discharge rate. The gas gauge 514 may track the number of battery charge/discharge full cycles for predicting the remaining life of the battery 517. For instance, a chargeable battery, such as Nickle metal hydride or Lithium ion batteries, is usually considered to have a usable life about 500 full cycles of charge and discharge. The gas gauge 514 may predict when the battery needs to be replaced, based on a usage history of the battery. The information may be represented by time, number of usage, or the number of full cycles that the battery can be charged or discharged.

In another embodiment, the gas gauge 514 predicts a period of available operation time based on the current battery capacity and historical data related to power consumptions in past alignment procedures. For example, the gas gauge 514 predicts that the battery has capacity to power the sensing head for 10 hours of alignment operation. This information allows technicians to better gauge how much time he or she has to finish the current alignment procedure before the battery dies, or determine whether a specific sensing head should be recharged in view of an anticipated workload.

In still another embodiment, the gas gauge 514 predicts how much time it would take to fully charge the battery, based on the current battery capacity and the current charging condition or past charging history.

The information related to the battery 514 and charging or usage conditions may be communicated to the user via the user interface 74, such as when the sensing heads are in use or being charged. The gas gauge 514 may be implemented with a bqJUNIOR series chips available from Texas Instruments, Inc.

In one embodiment, in addition to using an external power source, such as the shop AC power, to charge the battery 517, the charger 515 includes a backup power source for charging the battery 517 when the external power source is unavailable to the sensing head caused by power failure or disconnection of power line. The backup power source may be any types of power storage devices, such as rechargeable batteries, disposable batteries, chemical batteries, fuel cells, capacitive power storage devices like super capacitors or boost capacitors, etc., or any combinations thereof. The backup power storage device has a capacity sufficient to recharge a completely depleted battery 517.

When the shop AC power is available, the battery 517 may be recharged by the shop AC power or by the backup power storage device. When shop AC power is not connected or not available, the battery 517 is recharged by the backup power storage device only. This design enables the battery 517 to be recharged even when the shop AC power is completely turned off. The backup power storage device may be recharged during a regular recharge process when the shop AC power connects to the charging connector 516. Alternatively, the backup power storage device may be recharged separately, such as by adding fuel to fuel cells, or be replaced by another fully charged power storage device.

In another embodiment, an alignment system includes a docking device for detachably receiving the sensing heads and recharging the received sensing heads. When the sensing head is docked in the docking device, the battery 517 is recharged by an AC or DC power source connected to the docking device, and/or by a backup power storage device disposed in the docking device.

In another embodiment, the sensing head 55 includes an optional shock detection circuit utilizing a digital smart MEMs device that detects a free fall. A shock controller, which may be implemented by a Texas Instruments MPS430 microcontroller, acquires acceleration data from the smart MEMS device and records the time duration of the drop, to determine if a drop actually occurs and obtain and record information related to the drop, such as the time of fall and/or peak acceleration from the impact, for evaluation of damages and troubleshooting.

Advanced Power Management

An exemplary alignment system of this disclosure performs advanced power management to reduce non-essential power consumption. By reducing the power consumption, the operation time between charges is extended.

In one embodiment, when performing the advanced power management, the supervisor processor 560 determines whether one or more preset events have occurred. If at least one of the preset events indeed occurs, the supervisor processor 560 controls the sensing head 55 to perform prescribed steps to enter into a power saving mode, which consumes less power than a normal operation mode but does not completely shut down the power to the entire sensing head 55. Data specifying the preset events and the prescribed steps may be dynamically retrieved from a remote system using a data network or stored in a non-volatile memory device accessible by the supervisor processor 560, such as Flash memory 592.

In one embodiment, the prescribed steps include issuing a control signal to control suitable functional modules and/or components on the circuit board 75 to enter a sleep mode which consumes less power than a normal operation mode, by shutting part or all of the power supplied to some or all functional modules or components.

In another embodiment, the prescribed steps include reconfiguring the operation of functional modules or components of the sensing head, such as by reducing data sampling rates, reducing the resolution for imaging targets, reducing a frequency in fetching data from functional modules or peripheral devices, etc. For instance, the supervisor processor 560 may be ordered to operate in a mode that consumes less power by turning off power to various peripheral components internal to the supervisor processor 560, reducing the frequency of one or more clock signals, or turning off one or more clock signals, etc.

In another embodiment, an operation of the supervisor processor 560 or the DSP controller 61 is adjusted or altered based on a control signal, such as a real time clock signal. The supervisor processor 560 and/or the DSP controller 61 are set to operate in a power saving mode, such as by turning off power to various peripheral components internal to the supervisor processor 560, reducing the frequency of one or more clock signal, and/or turning off one or more clock signals, etc. A real time clock signal wakes up the supervisor processor 560 or the DSP controller 61 on a periodic basis. The supervisor processor 560 or the DSP controller 61 then performs needed tasks and return to the power saving mode once the tasks are completed, until the real time clock signal wakes them up. If there is no task to perform, the supervisor processor 560 or the DSP controller 61 immediately returns to the power saving mode.

For instance, if the real time clock signal wakes up the supervisor processor 560 and/or the DSP controller 61 every 0.1 sec, and each batch of data acquired during a data acquisition cycle requires 10 msec of processing time from the supervisor processor 560 or the DSP controller 61, the supervisor processor 560 or the DSP controller 61 only needs to be wakened up during the 10 msec processing period, and could returns to a sleep mode for the next 90 msec until being wakened up again by the real time clock signal.

In one power saving mode, power continues to be supplied to certain components on the circuit board 75 or some functional modules, such as the pitch sensor in the inclinometer module 579, a push button on the user interface 74 for a user to wake the sensing head from the power saving mode, the wireless communication interface for transmitting and receiving signals to and from the host compute system 100, etc. These components are continuously powered during the power saving mode allowing detection of a wake up event indicating that the sensing head 55 needs to exit the power saving mode. Examples of wake up events include:

a vibration or movement detected by the pitch sensor in the inclinometer module 579;

a wake up signal received from the host computer system 100 via the wireless communication interface module 552;

a pushed button on the user interface 74 indicating that a user wishes to operate the alignment system;

a spatial relationship change caused by the companion sensing head and detected by the spatial relationship sensor module 65;

. . .

etc.

When a wake up event occurs, an interrupt is sent to the supervisor processor 560. Responsive to the interrupt signal, the supervisor processor 560 issues commands to wake up one or more functional modules or components that were previously put into a sleep mode. In one embodiment, when the sensing head is operating in a power saving mode, the supervisor processor 560 operates in a mode that reduces non-essential power consumption. For instance, the supervisor processor 560 may turn off power to various peripheral components internal to the supervisor processor 560, reduce the frequency of one or more clock signals, or even turn off one or more clock signals, etc. A wake-up circuit monitors the arrival of the interrupt signals. When an interrupt signal indicating an occurrence of a wake up event arrives, the wake-up circuit issues a control signal to wake up the supervisor processor 560 and/or one or more functional modules or components.

Exemplary events that trigger the entry of power saving modes include:

lack of measurement angle changes within a predetermined period of time, such as the difference between two measurements being lower than a predetermined percentage;

lack of change in target orientations obtained by the camera module 61, such as the difference between two measurements being lower than a predetermined percentage;

lack of changes in target images captured by the camera module 61 such as the difference between two successive images being lower than a predetermined percentage;

lack of changes in the measurements from the inclinometer module 579, such as the difference between two measurements being lower than a predetermined percentage;

lack of change in the measurements from the spatial relationship sensor module 65, such as the difference between two measurements being lower than a predetermined percentage;

lack of change in the measurements from the potentiometer module 577, such as the difference between two measurements being lower than a predetermined percentage;

a pushed button signaling a user's command to enter power saving mode;

receipt of a command from the host computer system 100 to enter into power saving mode;

receipt of signals indicating one or more functional modules being in sleep mode;

lack of changes in data obtained by a specific functional module; and a battery low indication;

no target image for a predetermined period of time;

a reading of a real time clock signal indicating a power saving mode should be entered;

a completion of assigned tasks;

. . .

etc.

Examples of the prescribed step or steps including:

turning off part of or all power supplied to one or more functional modules and/or components of the sensing head;

reducing a frequency in fetching data from one or more functional modules or peripheral devices;

reducing the sampling rate of one or more functional modules in obtaining data, such as reducing a frequency of the camera module 61 in capturing target images or a frequency of the spatial relationship sensor module 65 in sampling signals from the companion sensing head;

reducing a frequency in performing calculations of data received from one or more functional modules;

skipping service of one or more functional modules if they are in sleep mode; and operating in a mode requiring less computation power or using less data, such as reducing a resolution or a frequency of the camera module 61 or the spatial relationship sensor module 65 in capturing images;

reducing an illumination intensity of the LED array module 83 by turning on fewer LEDs;

altering an illumination operation of the LED array module 83 by shortening illumination time or reducing duty cycles;

selectively purging data received from one or more functional modules;

shutting down the power to the DSP controller 561;

activating a notification signal on the user interface 74;

reducing the illumination intensity produced by the LED array module 83;

reducing a frequency of a wireless communication module in communicating with a companion sensing head or a host computer system turning off power supplied to one or more peripheral components internal to the supervisor processor 560 or the DSP controller 61;

reducing the frequency of one or more clock signals used in the supervisor processor 560 or the DSP controller 61; stopping generating one or more clock signals used in the supervisor processor 560 or the DSP controller 61; commanding one or more controllers on one or more functional modules to enter a sleep mode or a power saving mode;

. . .

etc.

It is understood that one or any combinations of the preset events may be combined with one or any combinations of the prescribed step or steps described herein. It is further understood that multiple levels of power saving can be achieved by selectively grouping the preset events and/or prescribed steps into various groups or sets. Each preset event or prescribed step may be assigned to a single or multiple groups or sets. Different levels of power saving are achieved by performing one or more groups of the prescribed steps in response to the occurrence of one or more sets of preset events.

The supervisor processor 560 keeps track of the operation mode of each functional module or component. For example, each functional module or component may alter a state of a signal line readable by the supervisor processor 560 indicating that the functional module or the component is operating in a normal operation mode or in a sleep mode.

If an interrupt signal occurs indicating that the sensing head 55 should exit from the power saving mode, the supervisor processor 560 controls the sensing head to perform one or more preset steps to exit from the power saving mode. Examples of the preset steps include at least one of:

turning on part of or all the power supplied to at least one of the functional modules or components;

increasing a frequency in fetching data from at least one of the functional modules or components;

increasing a sampling rate of at least one of the functional modules in obtaining sensed data;

increasing a frequency in performing calculations of data received from at least one of the functional modules or components;

resuming service of at lest one of the functional modules or components; and activating a notification signal indicating that the sensing head has exited the power saving mode;

. . .

etc.

It is understood that different types of control signals, different preset steps for exiting the power saving mode, different preset events for triggering entry of the power saving mode, and different prescribed steps for entering the power saving mode may be mixed and combined to achieve different levels of power saving. It is further understood that multiple levels of power saving can be achieved by selectively grouping different types of interrupts, different preset steps for exiting the power saving mode, different preset events for triggering entry of the power saving mode, and different prescribed steps for entering the power saving mode, into various groups or sets. Each interrupt, each preset step for exiting the power saving mode, each preset event, and each prescribed step for entering the power saving mode may be assigned to a single or multiple groups or sets. Different levels of power saving are achieved by mixing and associating different groups or sets. In one embodiment, the sensing head performs adaptive power management. The supervisor processor 560 intermittently checks whether a functional module or component (such as the DSP controller 561) lacks activity for a predetermined period of time. If it is determined that the inactivity of a functional module or component exceeds the predetermined period of time, the supervisor processor 560 gradually alters the operation of the functional module or component, or changes the manner that the supervisor processor 560 works related to the functional module or component, to reduce power consumption. For instance, the supervisor processor 560 gradually slows down the frequency in reading data from the functional module or component. The longer the period of inactivity, the lower the reading frequency until readings are stopped and the power to the functional module or component is turned off. In another embodiment, if the occurred preset event is lack of change in data obtained by at least one of the functional modules, the prescribed steps include gradually reduces a frequency in reading data from the at least one of the functional modules. The longer the lack of change in data remains, the lower the reading frequency until readings are stopped and the power to the functional module or component is turned off. If the occurred preset event is a low rate of change of the measurements, the prescribed steps include gradually reduces a frequency in reading data from at least one of the functional modules. The longer the change of the measurements remains at a lower rate, the lower the reading frequency until readings are stopped and the power to the functional module or component is turned off.

Figure 21A:
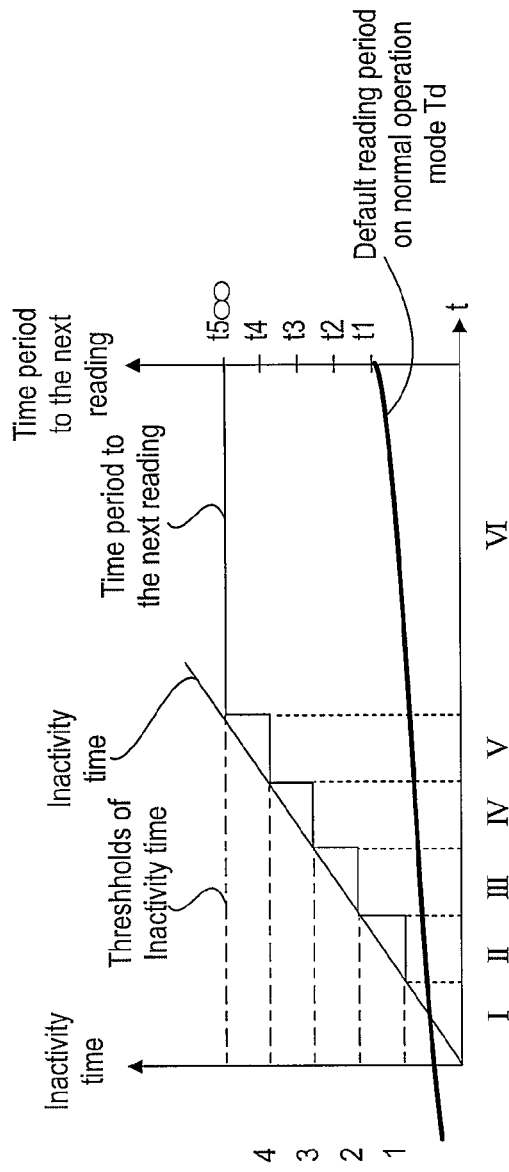
FIGS. 21A and 21B illustrate operations of an adaptive power management by gradually reducing power consumption based on a degree of inactivity of a functional module.

FIG. 21A shows an exemplary operation of adaptive power management altering a time period to the next sampling by a functional module or a time period to the next reading of data from a functional module by the supervisor processor 560. The left axis represents a period of inactivity time of a functional module, and the right axis is a time period that the supervisor processor 560 reads data from the functional module. The horizontal axis is the passage of time.

In time zone I, the inactivity time is less than the lowest threshold, indicating that the functional module is operating in a normal operation mode. Accordingly, the time period to the next reading of data from the functional module by the supervisor processor 560 is set to the default reading period Td. In time zone II, the inactivity time exceeds the first inactivity threshold, the time period to the next reading of data from the functional module by the supervisor processor 560 is increased to t1, which is longer than the default reading period Td. As the supervisor processor 560 operates in a power saving mode between readings, and can service the functional module less often in response to the functional module's longer period of inactivity, the non-essential power consumption is reduced.

In time zone III, as the inactivity time of the functional module continues to increase and exceeds the second threshold, the time period to the next reading of data from the functional module by the supervisor processor 560 is again increased to t2, to further reduce the service frequency by the supervisor processor 560. In time zones IV and V, the operations are similar to those described relative to time zones II and III, to gradually increase the time period to the next reading of data from the functional module, and to reduce non-essential power consumption.

If the inactivity time continues to rise and exceeds the fourth threshold, the time period to the next reading of data from the functional module is now t5, which is set to infinite meaning that the supervisor processor 560 will stop accessing data from the functional module entirely. A control signal will be issued to order the functional module to enter into a sleep mode.

Figure 21B:
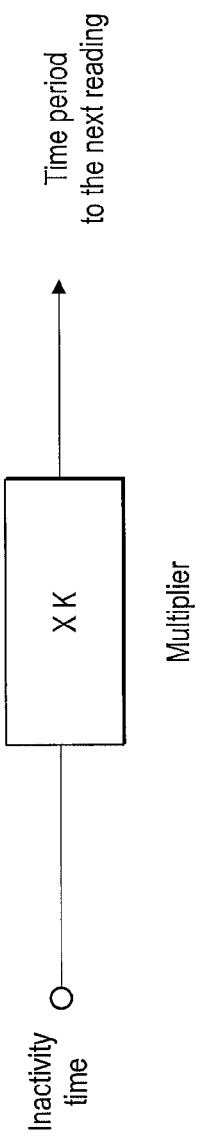

FIG. 21B shows another example of adaptive power management. Similar to the example illustrated in FIG. 21A, the time period to the next reading of data with respect to a functional module is adjusted based on the period of inactivity time of the functional module. As shown in FIG. 21B, inactivity time of a functional module is measured and fed to a multiplier which multiplies the input inactivity time with a constant or variable multiple k, wherein k is a real number. The output of the multiplier serves as a new time period to the next reading of data from the functional module. If the inactivity time of the functional module increases, the time period to the next reading increases as well. This mechanism reduces non-essential reading of or service to the functional module. Hence, power consumption is reduced.

In the exemplary operations shown in FIGS. 21A and 21B, if an interrupt signal arrives indicating that the functional module should be wakened up, the inactivity time is reset to zero or any predetermined number. As a result, in the example shown in FIG. 21A, the time period to the next reading of data from the functional module by the supervisor processor 560 is now again set to Td, the default reading period.

The same techniques described with respect to FIGS. 21A and 21B may be utilized to change or modify a sampling period for a functional module in capturing or sampling data. For instance, the techniques may be used to change the frequency that the camera module 61 captures images of a target attached to the front wheel on the same side of the vehicle.

According to another embodiment, the adaptive power management may be implemented based on a rate of change of data obtained or sensed by a functional module. The less the readings change, the lower the reading frequency until readings are stopped and the functional module or component is ordered to enter a sleep mode. The supervisor processor 560 continuously monitors the rate of change of data obtained by the functional module, and compares the rate with multiple preset thresholds, in a way similar to the techniques described relative to FIGS. 21A and 21B. For instance, if the rate of change is lower than a predetermined threshold, the supervisor processor 560 gradually decreases the reading frequency.

In another embodiment, the sensing head by default is set to operate in a powering saving mode which shuts down part or all of the power supplied to one or more functional modules or components on the circuit board 75. Only when an interrupt signal arrives to the supervisor processor 560 do one or more selected functional modules or components wake up to perform intended functions or calculations.

According to still another embodiment, a critically low battery condition triggers a unique set of prescribed steps that would extend battery life by reducing the amount of data used for calculating alignment parameters or altering a manner that a functional module or component operates. For instance, the prescribed steps my include reducing the data acquisition frequency by the supervisor processor 560, reducing a functional module's data sampling rate, disabling non-essential devices, altering the frequency of one or more clock signals, and/or capturing images using a lower resolution. The battery condition may be reported to the supervisor processor 560 by gas gauge 514.

In another embodiment, a unique image sensing configuration is utilized to reduce power consumption. As described earlier related to FIG. 19, the spatial relationship sensor module 65 uses a beam angle detection technology, to detect a relative position to the companion sensing head. As described earlier relative to FIG. 6, the sensor module 65 includes the linear image sensor 87, which may be implemented using a 3648 pixel linear CCD, and an aperture 86, for detecting a beam of light projected by a similar sensor module in the opposite head 57. The IR light/radiation from the opposing head 57 is sensed by the linear image sensor 87, via the aperture 86. The precise point on the sensor 87 at which the IR light from the other head is detected indicates the relative angle of incidence of the light from the opposite head at the sensor 87 in the head 55.

Applicants note that only a portion of the 3648 pixels is needed to perform the beam angle detection ("effective pixels"), while other portions of the pixels either are redundant or convey no meaningful data for beam angle detection ("ineffective pixels"). In one embodiment, only 1000 pixels are needed to achieve the desired measurement range and resolution required for accurate measurements of the wheel toe angles. The spatial relationship sensor 65 positions the aperture 86 at a unique location relative to the CCD sensors, such that the pixels exposed to the IR light from the companion head 57, which are needed to perform the beam angle detection, are the first 1000 pixels that are shifted out of the CCD shift register during a read cycle. During a read cycle, only pixel data produced by these first 1000 pixels are shifted out of the CCD. The remaining pixels from the ineffective pixels are purged and the spatial relationship sensor module 65 is shut down until it is time to take another reading. In another embodiment, some types of sensors, such CMOS sensors, allows direct access of pixels of interest by directly addressing the effective pixels during a read cycle.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A wheel alignment head configured to obtain measurements usable in calculating wheel alignment parameters of a vehicle, wherein the alignment head is operable in a first operation mode and in a second operation mode consuming less power than the first operation mode, and responsive to an occurrence of at least one preset event, the wheel alignment head switches from the first operation mode to the second operation mode, comprising
    one or more functional modules, each of which is configured to perform a designated function; and
    a data processor, coupled to the functional modules, for processing data,
    wherein when entering the second operation mode, the data processor issues a command to selectively adjust an operation of the alignment head in response to the occurrence of the at least one preset event, and
    wherein the data processor, upon execution of pre-stored machine-readable instructions, controls the alignment head to enter the second operation mode by selectively performing one or more prescribed steps corresponding to a respective occurred preset event.

2. The alignment head of claim 1, wherein the functional modules includes at least one of:
    a wireless communication interface configured to communicate with a computer or a companion alignment head;
    at least one tilt sensor for sensing a tilt angle of the alignment head;
    a rotary sensor;
    an image sensor for producing data representing an image taken of a target associated with a vehicle wheel;
    a spatial relationship sensor for measuring a spatial relationship between the alignment head and a companion alignment head;
    an illumination device configured to illuminate the target;
    a battery configured to power the alignment head;
    a gas gauge configured to generate information related to the battery; and
    a user interface configured to output information and input command.

3. The alignment head of claim 1, wherein during the second operation mode, the data processor enters into an operation mode consuming less power by at least one of:
    reducing a frequency of one or more clock signals used by the data processor; and
    turning off power to one or more peripheral devices internal to the data processor.

4. The alignment head of claim 1, wherein:
    the data processor selectively switches between a first processor operation mode and a second processor operation mode that consumes less power than the first processor operation mode, and
    a period of time that the data processor remains in the first processor operation mode is determined based on a period of time needed for processing data sent from the functional modules.

5. The alignment head of claim 1, wherein:
    the data processor selectively switches between a first processor operation mode and a second processor operation mode that consumes less power than the first processor operation mode, and
    the data processor switches from the second processor operation mode to the first processor operation mode according to a reading of a real time clock signal.

6. The alignment head of claim 1, wherein the at least one preset event includes at least one of a low battery charge level, lack of change in data obtained by at least one of the functional modules, a low rate of change of the measurements, an input signaling entry to the second operation mode, an increase in inactivity time of one of the functional modules, completion of an assigned task, a reading of a clock signal, and receipt of a command from the computer to enter into the second operation mode.

7. The alignment head of claim 1, wherein the one or more prescribed steps include at least one of:
    turning off part or all of the power supplied to at least one of the functional modules or the data processor;
    reducing a frequency in fetching data from at least one of the functional modules;
    reducing a sampling rate of at least one of the functional modules in obtaining sensed data;
    reducing a frequency in performing calculations of data received from at least one of the functional modules;
    skipping service at least one of the functional modules;
    altering an operation of at least one of the functional modules;
    selectively purging data received from at least one of the functional modules;
    reducing a frequency of one or more clock signals used by the data processors;
    turning off power to one or more peripheral devices internal to the data processor;
    reducing a frequency of one or more clock signals used by a controller on at least one of the functional modules;
    turning off power to one or more peripheral devices internal to a controller on at least one of the function modules; and
    activating a notification signal.

8. The alignment head of claim 7, wherein the altering an operation of at least one of the functional modules includes at least one of:

reducing a frequency of the at least one of the functional modules in capturing target images;

switching to a lower image resolution for the at least one of the functional modules in capturing target images;

reducing an intensity of illumination produced by the at least one of the functional modules;

altering an illumination operation of the at least one of the functional modules;

reducing a frequency of the at least one of the functional modules in sensing signals from a companion alignment head; and reducing a frequency of the at least one of the functional modules in communicating with a companion alignment head or a computer system.

9. The alignment head of claim 6, wherein:

if the occurred preset event is an increase in inactivity time of one of the functional modules, the prescribed steps include:
measuring the inactivity time of the one of the functional modules; and
gradually reduces a frequency in reading data from the one of the functional modules, based on the measured inactivity time;

if the occurred preset event is lack of change in data obtained by at least one of the functional modules, the prescribed steps include:
gradually reduces a frequency in reading data from the at least one of the functional modules;
and if the occurred preset event is a low rate of change of the measurements, the prescribed steps include:
gradually reduces a frequency in reading data from at least one of the functional modules.

10. A wheel alignment system comprising:

a pair of passive alignment heads, each head of the pair of passive alignment heads comprising a target, for mounting in association with a first pair of wheels of a vehicle;

a pair of active alignment heads for mounting in association with a second pair of wheels of the vehicle and for producing image data including a representation of an image of one of the targets;

a spatial relationship sensor associated with at least one of the active alignment heads, for measuring a relationship between the active alignment heads, and a computer for processing image data relating to observation of the targets and relationship data from the spatial relationship sensor, to compute at least one alignment measurement of the vehicle;

wherein each head of the pair of active alignment heads is configured to obtain measurements usable in calculating wheel alignment parameters of a vehicle, and is operable in a first operation mode and in a second operation mode consuming less power than the first operation mode, and responsive to an occurrence of at least one preset event, switches from the first operation mode to the second operation mode.

11. The wheel alignment system of claim 10, wherein the spatial relationship sensor comprises two relative angle sensing modules, one module being associated with each of the active alignment heads.

12. The wheel alignment system of claim 10, wherein each of the sensing modules comprises:
an emitter for emitting a beam of light;
an aperture; and
an image sensor for sensing an angle of an incoming beam of light through the aperture.

13. The wheel alignment system of claim 10, wherein the spatial relationship sensor associated with at least one of the alignment heads comprises an illuminator and a camera mounted on a first one of the active alignment heads.

14. The wheel alignment system of claim 10, wherein:
at least one of the active alignment heads further comprises at least one tilt sensor for sensing a tilt angle of the one active alignment head when the one active alignment head is mounted on a wheel of the vehicle; and
the computer is programmed to compute at least one measurement of the vehicle, in response to the sensed tilt angle.

15. The wheel alignment system of claim 10, wherein the at least one tilt sensor comprises a pitch tilt sensor and a camber tilt sensor.

* * * * *